US011017340B2

(12) United States Patent
Han et al.

(10) Patent No.: US 11,017,340 B2
(45) Date of Patent: May 25, 2021

(54) SYSTEMS AND METHODS FOR CHEAT EXAMINATION

(71) Applicant: BEIJING DIDI INFINITY TECHNOLOGY AND DEVELOPMENT CO., LTD., Beijing (CN)

(72) Inventors: Bei Han, Shanghai (CN); Lingyu Zhang, Beijing (CN); Licai Qi, Hangzhou (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 16/893,653

(22) Filed: Jun. 5, 2020

(65) Prior Publication Data
US 2020/0302362 A1  Sep. 24, 2020

Related U.S. Application Data

(63) Continuation of application No. PCT/CN2018/112363, filed on Oct. 29, 2018.

(30) Foreign Application Priority Data

Dec. 5, 2017  (CN) .......................... 201711266929.9
Dec. 12, 2017 (CN) .......................... 201711316285.X
Dec. 25, 2017 (CN) .......................... 201711424818.6

(51) Int. Cl.
*G06Q 10/06* (2012.01)
(52) U.S. Cl.
CPC . *G06Q 10/06315* (2013.01); *G06Q 10/06312* (2013.01); *G06Q 10/06314* (2013.01)

(58) Field of Classification Search
None
See application file for complete search history.

(56) References Cited

U.S. PATENT DOCUMENTS

2007/0088528 A1   4/2007  Miller
2008/0015919 A1*  1/2008  Busse .............. G06Q 10/06375
                                                        705/7.13
(Continued)

FOREIGN PATENT DOCUMENTS

CN       102118276 A      7/2011
CN       103236948 A      8/2013
(Continued)

OTHER PUBLICATIONS

International Search Report in PCT/CN2018/112363 dated Jan. 18, 2019, 4 pages.
(Continued)

*Primary Examiner* — Eric W Stamber
*Assistant Examiner* — Ashley Y Young
(74) *Attorney, Agent, or Firm* — Metis IP LLC

(57) ABSTRACT

A system includes a storage device storing a set of instructions and at least one processor in communication with the storage device. When executing the instructions, the at least one processor is configured to obtain, via a network, rule information for rules for determining alert from a rule library and obtain, via the network, operation data of the on-demand service from a storage medium. The at least one processor may also cause the system to determine whether the operation data is in accordance with the rules for determining alert based on the rule information and determine an alert based on the determination that the operation data is in accordance with the rules for determining alert.

(Continued)

The at least one processor may further cause the system to and transmit the alert to be displayed to managers of the on-demand service.

9 Claims, 18 Drawing Sheets

(56) References Cited

U.S. PATENT DOCUMENTS

| | | | |
|---|---|---|---|
| 2017/0030736 A1 | 2/2017 | Yang et al. | |
| 2017/0293757 A1 | 10/2017 | Rosenman et al. | |
| 2018/0314616 A1* | 11/2018 | Savolainen | G06F 11/3442 |

FOREIGN PATENT DOCUMENTS

| CN | 103441896 A | 12/2013 |
|---|---|---|
| CN | 104063747 A | 9/2014 |
| CN | 104133986 A | 11/2014 |
| CN | 104899674 A | 9/2015 |
| CN | 106789186 A | 9/2015 |
| CN | 105160711 A | 12/2015 |
| CN | 105323111 A | 2/2016 |
| CN | 105719109 A | 6/2016 |
| CN | 107092544 A | 8/2017 |
| CN | 107168854 A | 9/2017 |
| CN | 107341668 A | 11/2017 |
| CN | 107423198 A | 12/2017 |

OTHER PUBLICATIONS

Written Opinion in PCT/CN2018/112363 dated Jan. 18, 2019, 4 pages.
First Office Action in Chinese Application No. 201711266929.9 dated Dec. 24, 2019, 18 pages.
The Second Office Action in Chinese Application No. 201711266929.9 dated Jun. 28, 2020, 15 pages.
First Office Action in Chinese Application No. 201711316285.X dated Apr. 21, 2020, 9 pages.

* cited by examiner

SYSTEMS AND METHODS FOR CHEAT EXAMINATION

CROSS-REFERENCE TO RELATED APPLICATIONS

This application is a Continuation of International Application No. PCT/CN2018/112363, filed on Oct. 29, 2018, which claims priority to Chinese Application No. 201711266929.9 filed on Dec. 5, 2017, Chinese Application No. 201711316285.X filed on Dec. 12, 2017, and Chinese Application No. 201711424818.6 filed on Dec. 25, 2017. Each of the above-referenced applications is incorporated herein by reference in its entirety.

TECHNICAL FIELD

The present disclosure generally relates to systems and methods for monitoring an on demand platform (e.g., an online to offline platform), and in particular, to systems and methods for determining alert in the on demand platform.

BACKGROUND

In the related technology, different services adopt different service monitoring systems. Before the service alarms, the code pages need to be packaged and published, and different business rules cannot be uniformly configured, maintained, and managed in one system. Therefore, it is necessary to provide a method for service monitoring based on service logs of multiple service systems to solve the problem that business rules cannot be uniformly managed.

At present, the business of hailing a car, trading, and watching live broadcasts through a platform is becoming more and more popular, and the number of users is large. If the platform is abnormal, the user cannot use the platform normally, resulting in severe fluctuations of order quantity, number of people, and business volume measurements. The operation and maintenance personnel cannot monitor the abnormal status of the service platform in time. The existing solution is to inform the customer service personnel of the platform of the abnormal situation. The platform operation and maintenance personnel may not monitor the abnormal situation of the service platform in time and process the abnormal conditions. Thus, the experience of the users may be affected.

In the scenario of hailing a car, the dynamically adjusted price is a means of adjusting the balance between supply and demand, and its purpose is to enhance the user's experience of hailing a car. However, due to various reasons, there is often a situation in which the ratio relating to orders with dynamically adjusted prices is abnormal. For example, in certain days, the ratio may skyrocket. Too unusual abnormal ratio may affect the user's experience, causing user's complaints and in more seriously situations, a loss of users. Therefore, it is particularly important to monitor the abnormality of the ratio relating to orders with dynamically adjusted prices.

At present, the on-demand service platform may be engaged in a plurality of kinds of businesses, such as car-hailing, car rental, car-sharing, or the like. The platform may provide users with a lot of services every minute. As a result, a large number of orders may be assigned and finished every minute. For attracting new users and improving user's experience, it is important for the platform to keep its stability. However, in unusual conditions, such as when the platform is under cyber attack or becomes abnormal due to system glitches, the users may not access the platform successfully or may have bad experience with the services and/or prices provided. Without a timely and accurate alert system, the managers of the on demand platform may not be able to take actions to subdue the abnormality. Therefore, it is desirable to have systems and methods for determining alert in case an abnormality emerges.

SUMMARY

According to an aspect of the present disclosure, a system may include a storage device storing a set of instructions and one or more processors in communication with the storage device. When executing the instructions, one or more processors may be configured to cause the system to obtain, via a network, rule information for rules for determining alert from a rule library associated with the on-demand service and obtain, via the network, operation data of the on-demand service from a storage medium. The one or more processors may also cause the system to determine whether the operation data is in accordance with the rules for determining alert based on the rule information and determine an alert based on the determination that the operation data is in accordance with the rules for determining alert. The one or more processors may further cause the system to transmit the alert to be displayed to managers of the on-demand service.

In some embodiments, the alert may be displayed in a format including figure and/or chart.

In some embodiments, the operation data may be associated with the rule information.

In some embodiments, the alert may include suggestion information. The suggestion information may inquire whether the managers choose to eliminate the alert by changing operation of the on-demand service.

In some embodiments, the one or more processors may also cause the system to, in response to receiving a reply from managers of the on-demand service to change the operation of the on-demand service, extract part of the operation data that causes the alert, and change the operation of the on-demand service based on the part of the operation data.

According to another aspect of the present disclosure, a computer-implemented method may include one or more of the following operations performed by one or more processors. The method may include obtaining, via a network, rule information for rules for determining alert from a rule library associated with the on-demand service and obtaining, via the network, operation data of the on-demand service from a storage medium. The method may also include determining whether the operation data is in accordance with the rules for determining alert based on the rule information and determining an alert based on the determination that the operation data is in accordance with the rules for determining alert. The method may further include transmitting the alert to be displayed to managers of the on-demand service.

According to another aspect of the present disclosure, a system may include a storage device storing a set of instructions and one or more processors in communication with the storage device. When executing the instructions, one or more processors may be configured to cause the system to obtain a business volume measurement relating to a current period and determine whether the business volume measurement is outside an expected range for business volume measurement of the current period. The one or more processors may also cause the system to transmit an alert to a predetermined target terminal based on the determination that the business volume measurement is outside the expected range for business volume measurement of the current period. In some embodiments, the alert may be displayed to managers of the on-demand service. In some embodiments, the expected range for business volume measure of the current period may be provided by: obtaining, a plurality of historical business volume measurements made in historical periods corresponding to the current period; determining a plurality of variances of change rates corresponding to the plurality of historical business volume measurements; and determining the expected range of business volume measurement of the current period based on the plurality of variances of change rates and the corresponding plurality of historical business volume measurements.

In some embodiments, The one or more processors may also cause the system to determine, based on the plurality of variances of change rates and the corresponding plurality of historical business volume measurements, a fitting curve and determine, based on the fitting curve and the corresponding plurality of historical business volume measurements, the expected range of business volume measurement of the current period.

In some embodiments, for each historical business volume measurement, the one or more processors may cause the system to determine a reference period relating to the each historical business volume measurement and obtain a plurality of target historical business volume measurements relating to periods before the reference period. For the each historical business volume measurement, the one or more processors may also cause the system to determine a plurality of groups by designating two adjacent target historical business volume measurements in time as a group and, for each group, determine a change rate of a posterior target historical business volume measurement to a previous target historical business volume measurement. For the each historical business volume measurement, the one or more processors may further cause the system to determine an average value of a plurality of change rates corresponding to the plurality of groups and determine, based on the plurality of change rates and the average value, the variance of change rate corresponding to the each historical business volume measurement.

In some embodiments, the one or more processors may also cause the system to determine, based on a previous historical business volume measurement relating to a previous period of the current period and the fitting curve, a previous variance of change rate of the previous historical business volume measurement and determine, based on the previous variance of change rate, a previous interval of the change rate of the previous historical business volume measurement. The one or more processors may further cause the system to and determine, based on the previous interval of the change rate, the expected range of business volume measurement of the current period.

In some embodiments, the alert may include suggestion information. The suggestion information may indicate that the business volume measurement relating to the current period is abnormal and inquire whether the managers choose to eliminate the alert by changing operation of the on-demand service.

In some embodiments, the one or more processors may also cause the system to, in response to receiving a reply from managers of the on-demand service to change the operation of the on-demand service, extract part of the operation data that causes the alert, and change the operation of the on-demand service based on the part of the operation data, wherein the part of the operation data includes the abnormal business volume measurement relating to the current period.

According to still another aspect of the present disclosure, a computer-implemented method may include one or more of the following operations performed by one or more processors. The method may include obtaining a business volume measurement relating to a current period and determining whether the business volume measurement is outside an expected range for business volume measurement of the current period. The method may also include transmitting an alert to a predetermined target terminal based on the determination that the business volume measurement is outside the expected range for business volume measurement of the current period. In some embodiments, the alert may be displayed to managers of the on-demand service. In some embodiments, the expected range for business volume measure of the current period may be provided by: obtaining, a plurality of historical business volume measurements made in historical periods corresponding to the current period; determining a plurality of variances of change rates corresponding to the plurality of historical business volume measurements; and determining the expected range of business volume measurement of the current period based on the plurality of variances of change rates and the corresponding plurality of historical business volume measurements.

According to another aspect of the present disclosure, a system may include a storage device storing a set of instructions and one or more processors in communication with the storage device. When executing the instructions, one or more processors may be configured to cause the system to obtain, via a network, a first ratio of orders with dynamically adjusted prices during a detection period and determine whether the first ratio is outside an expected ratio-range. The one or more processors may also cause the system to send an alert based on a determination that the first ratio is outside the expected ratio-range. In some embodiments, the alert is to be displayed to managers of the on-demand service. In some embodiments, the expected ratio-range is provided by: obtaining, via the network, a plurality of second ratios of historical orders with dynamically adjusted prices, the historical orders are made in historical time periods corresponding to the detection period and determining, based on the plurality of second ratios, the expected ratio-range of the detection period.

In some embodiments, the one or more processors may also cause the system to determine a dimension of the detection period and determine a plurality of periods in predetermined days before the detection period. The one or more processors may further cause the system to and determine the plurality of second ratios of historical orders with dynamically adjusted prices during the plurality of periods. In some embodiments, each of the plurality of periods may have a same dimension as the dimension of the detection period. In some embodiments, each second ratio may be associated with historical orders during a period in a predetermined day.

In some embodiments, the one or more processors may also cause the system to determine an average value and a standard variance relating to the plurality of second ratios and determining the expected ratio-range based on the average value and the standard variance.

In some embodiments, the alert may include suggestion information. The suggestion information may indicate that the first ratio is abnormal and inquire whether the managers choose to eliminate the alert by changing operation of the on-demand service.

In some embodiments, the one or more processors may also cause the system to, in response to receiving a reply from managers of the on-demand service to change the operation of the on-demand service, extract part of the operation data that causes the alert, and change the operation of the on-demand service based on the part of the operation data, wherein the part of the operation data includes the first ratio or a number count of orders with dynamically adjusted prices.

According to still another aspect of the present disclosure, a computer-implemented method may include one or more of the following operations performed by one or more processors. The method may include obtaining, via a network, a first ratio of orders with dynamically adjusted prices during a detection period and determining whether the first ratio is outside an expected ratio-range. The method may also include sending an alert based on a determination that the first ratio is outside the expected ratio-range. In some embodiments, the alert is to be displayed to managers of the on-demand service. In some embodiments, the expected ratio-range is provided by: obtaining, via the network, a plurality of second ratios of historical orders with dynamically adjusted prices, the historical orders are made in historical time periods corresponding to the detection period and determining, based on the plurality of second ratios, the expected ratio-range of the detection period.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
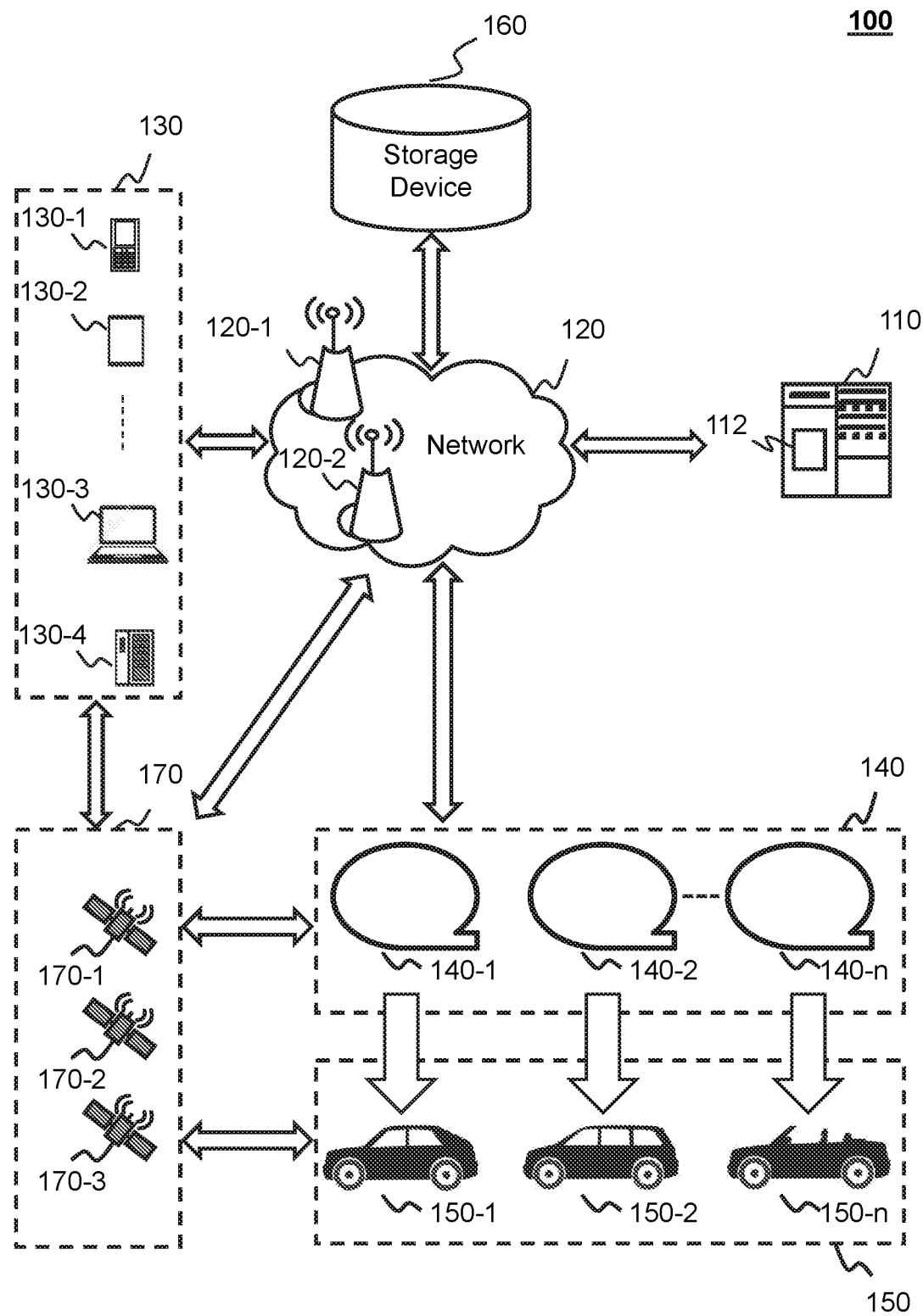
FIG. 1 is a block diagram illustrating an exemplary online-to-offline service system according to some embodiments.

The following description is presented to enable any person skilled in the art to make and use the present disclosure and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, steps, elements, and/or components, but do not preclude the presence or addition of one or more other features, integers, steps, steps, elements, components, and/or groups thereof.

These and other features, and characteristics of the present disclosure, as well as the methods of step and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate steps that systems implement according to some embodiments described in the present disclosure. It is to be expressly understood, the steps of the flowchart may be implemented not in order. Conversely, the steps may be implemented in inverted order, or simultaneously. Moreover, one or more other steps may be added to the flowcharts. One or more steps may be removed from the flowcharts.

Moreover, while the system and method in the present disclosure are described primarily with regard to distributing a request for a transportation service, it should also be understood that the present disclosure is not intended to be limiting. The system or method of the present disclosure may be applied to any other kind of online-to-offline service. For example, the system or method of the present disclosure may be applied to transportation systems of different environments including land, ocean, aerospace, or the like, or any combination thereof. The vehicle of the transportation systems may include a taxi, a private car, a hitch, a bus, a train, a bullet train, a high-speed rail, a subway, a vessel, an aircraft, a spaceship, a hot-air balloon, a driverless vehicle, or the like, or any combination thereof. The transportation system may also include any transportation system for management and/or distribution, for example, a system for transmitting and/or receiving an express. The application of the system or method of the present disclosure may be implemented on a user device and include a web page, a plug-in of a browser, a client terminal, a custom system, an internal analysis system, an artificial intelligence robot, or the like, or any combination thereof.

The term "passenger," "requestor," "service requestor," and "customer" in the present disclosure are used interchangeably to refer to an individual, an entity, or a tool that may request or order a service. Also, the term "driver," "provider," and "service provider" in the present disclosure are used interchangeably to refer to an individual, an entity, or a tool that may provide a service or facilitate the providing of the service.

The term "service request," "request for a service," "requests," and "order" in the present disclosure are used interchangeably to refer to a request that may be initiated by a passenger, a service requestor, a customer, a driver, a provider, a service provider, or the like, or any combination thereof. The service request may be accepted by any one of a passenger, a service requestor, a customer, a driver, a provider, or a service provider. The service request may be chargeable or free.

The term "service provider terminal" and "driver terminal" in the present disclosure are used interchangeably to refer to a mobile terminal that is used by a service provider to provide a service or facilitate the providing of the service. The term "service requestor terminal" and "passenger terminal" in the present disclosure are used interchangeably to refer to a mobile terminal that is used by a service requestor to request or order a service.

The positioning technology used in the present disclosure may be based on a global positioning system (GPS), a global navigation satellite system (GLONASS), a compass navigation system (COMPASS), a Galileo positioning system, a quasi-zenith satellite system (QZSS), a wireless fidelity (WiFi) positioning technology, or the like, or any combination thereof. One or more of the above positioning systems may be used interchangeably in the present disclosure.

An aspect of the present disclosure relates to online systems and methods for determining whether a service order is a cheating (or fake) service order. Reference information and actual information related to a service order may be obtained. Whether the service order is a cheating service order may be determined based on the reference and the actual information. In some embodiments, checkpoint information related to the service order may be obtained. Data groups may be determined based on the checkpoint information. The reachability in both time and space and relating to each data group may be determined. Whether the service order is a cheating service order may be determined based on a determination result of the reachability relating to each data group.

In another embodiment, reference time period during which an acceleration of a vehicle related to the service order equals to a first predetermined value may be determined. The actual time period during which the acceleration equals to a first predetermined value may be determined. Whether the service order is a cheating service order may be determined based on the reference time period and the actual time period. In some embodiments, reference driving trails relating to the service order may be determined. Position coordinates relating to the service order may be uploaded by a terminal during a process for completing the service order may be determined. Whether the service order is a cheating service order may be determined based on deviations between the reference driving trails and the position coordinates.

FIG. 1 is a block diagram illustrating an exemplary online-to-offline service system 100 according to some embodiments. For example, the online-to-offline service system 100 may be an online transportation service platform for transportation services. The online-to-offline service system 100 may include a server 110, a network 120, a service requestor terminal 130, a service provider terminal 140, a vehicle 150, a storage device 160, and a navigation system 170.

The online-to-offline service system 100 may provide a plurality of services. Exemplary service may include a taxi-hailing service, a chauffeur service, an express car service, a carpool service, a bus service, a driver hire service, and a shuttle service. In some embodiments, the online-to-offline service may be an online service, such as booking a meal, shopping, or the like, or any combination thereof.

In some embodiments, the server 110 may be a single server or a server group. The server group may be centralized, or distributed (e.g., the server 110 may be a distributed system). In some embodiments, the server 110 may be local or remote. For example, the server 110 may access information and/or data stored in the service requestor terminal 130, the service provider terminal 140, and/or the storage device 160 via the network 120. As another example, the server 110 may be directly connected to the service requestor terminal 130, the service provider terminal 140, and/or the storage device 160 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processing engine 112. The processing engine 112 may process information and/or data related to the service request to perform one or more functions described in the present disclosure. For example, the processing engine 112 may determine alert of the on-demand service. In some embodiments, the processing engine 112 may include one or more processing engines (e.g., single-core processing engine(s) or multi-core processor(s)). Merely by way of example, the processing engine 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The network 120 may facilitate exchange of information and/or data. In some embodiments, one or more components in the online-to-offline service system 100 (e.g., the server 110, the service requestor terminal 130, the service provider terminal 140, the vehicle 150, the storage device 160, and the navigation system 170) may send information and/or data to other component(s) in the online-to-offline service system 100 via the network 120. For example, the server 110 may receive a service request from the service requestor terminal 130 via the network 120. In some embodiments, the network 120 may be any type of wired or wireless network, or combination thereof. Merely by way of example, the network 120 may include a cable network, a wireline network, an optical fiber network, a tele communications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the online-to-offline service system 100 may be connected to the network 120 to exchange data and/or information.

In some embodiments, a passenger may be an owner of the service requestor terminal 130. In some embodiments, the owner of the service requestor terminal 130 may be someone other than the passenger. For example, an owner A of the service requestor terminal 130 may use the service requestor terminal 130 to send a service request for a passenger B or receive a service confirmation and/or information or instructions from the server 110. In some embodiments, a service provider may be a user of the service provider terminal 140. In some embodiments, the user of the service provider terminal 140 may be someone other than the service provider. For example, a user C of the service provider terminal 140 may use the service provider terminal 140 to receive a service request for a service provider D, and/or information or instructions from the server 110. In some embodiments, "passenger" and "passenger terminal" may be used interchangeably, and "service provider" and "service provider terminal" may be used interchangeably. In some embodiments, the service provider terminal may be associated with one or more service providers (e.g., a night-shift service provider, or a day-shift service provider).

In some embodiments, the service requestor terminal 130 may include a mobile device 130-1, a tablet computer 130-2, a laptop computer 130-3, a built-in device in a vehicle 130-4, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, a smart glass, a smart helmet, a smart watch, smart clothing, a smart backpack, a smart accessory, or the like, or any combination thereof. In some embodiments, the smart mobile device may include a smartphone, a personal digital assistant (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google™ Glass, an Oculus Rift, a HoloLens, a Gear VR, etc. In some embodiments, the built-in device in the vehicle 130-4 may include an onboard computer, an onboard television, etc. In some embodiments, the service requestor terminal 130 may be a device with positioning technology for locating the position of the passenger and/or the service requestor terminal 130.

The service provider terminal 140 may include a plurality of service provider terminals 140-1, 140-2, . . . , 140-n. In some embodiments, the service provider terminal 140 may be similar to, or the same device as the service requestor terminal 130. In some embodiments, the service provider terminal 140 may be customized to be able to implement the online-to-offline service. In some embodiments, the service provider terminal 140 may be a device with positioning technology for locating the service provider, the service provider terminal 140, and/or a vehicle 150 associated with the service provider terminal 140. In some embodiments, the service requestor terminal 130 and/or the service provider terminal 140 may communicate with another positioning device to determine the position of the passenger, the service requestor terminal 130, the service provider, and/or the service provider terminal 140. In some embodiments, the service requestor terminal 130 and/or the service provider terminal 140 may periodically send the positioning information to the server 110. In some embodiments, the service provider terminal 140 may also periodically send the availability status to the server 110. The availability status may indicate whether a vehicle 150 associated with the service provider terminal 140 is available to carry a passenger. For example, the service requestor terminal 130 and/or the service provider terminal 140 may send the positioning information and the availability status to the server 110 every thirty minutes. As another example, the service requestor terminal 130 and/or the service provider terminal 140 may send the positioning information and the availability status to the server 110 each time the user logs into the mobile application associated with the online-to-offline service.

In some embodiments, the service provider terminal 140 may correspond to one or more vehicles 150. The vehicles 150 may carry the passenger and travel to the destination. The vehicles 150 may include a plurality of vehicles 150-1, 150-2, . . . , 150-n. One vehicle may correspond to one type of services (e.g., a taxi hailing service, a chauffeur service, an express car service, a carpool service, a bus service, a driver hire service and a shuttle service).

The storage device 160 may store data and/or instructions. In some embodiments, the storage device 160 may store data obtained from the service requestor terminal 130 and/or the service provider terminal 140. In some embodiments, the storage device 160 may store data and/or instructions that the server 110 may execute or use to perform exemplary methods described in the present disclosure. In some embodiments, the storage device 160 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage device 160 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 160 may be connected to the network 120 to communicate with one or more components in the online-to-offline service system 100 (e.g., the server 110, the service requestor terminal 130, the service provider terminal 140, etc.). One or more components in the online-to-offline service system 100 may access the data or instructions stored in the storage device 160 via the network 120. In some embodiments, the storage device 160 may be directly connected to or communicate with one or more components in the online-to-offline service system 100 (e.g., the server 110, the service requestor terminal 130, the service provider terminal 140, etc.). In some embodiments, the storage device 160 may be part of the server 110.

The navigation system 170 may determine information associated with an object, for example, one or more of the service requestor terminal 130, the service provider terminal 140, the vehicle 150, etc. In some embodiments, the navigation system 170 may be a global positioning system (GPS), a global navigation satellite system (GLONASS), a compass navigation system (COMPASS), a BeiDou navigation satellite system, a Galileo positioning system, a quasi-zenith satellite system (QZSS), etc. The information may include a location, an elevation, a velocity, or an acceleration of the object, or a current time. The navigation system 170 may include one or more satellites, for example, a satellite 170-1, a satellite 170-2, and a satellite 170-3. The satellites 170-1 through 170-3 may determine the information mentioned above independently or jointly. The satellite navigation system 170 may send the information mentioned above to the network 120, the service requestor terminal 130, the service provider terminal 140, or the vehicle 150 via wireless connections.

In some embodiments, one or more components in the online-to-offline service system 100 (e.g., the server 110, the service requestor terminal 130, the service provider terminal 140, etc.) may have permissions to access the storage device 160. In some embodiments, one or more components in the online-to-offline service system 100 may read and/or modify information related to the passenger, service provider, and/or the public when one or more conditions are met. For example, the server 110 may read and/or modify one or more passengers' information after a service is completed. As another example, the server 110 may read and/or modify one or more service providers' information after a service is completed.

In some embodiments, information exchanging of one or more components in the online-to-offline service system 100 may be initiated by way of requesting a service. The object of the service request may be any product. In some embodiments, the product may include food, medicine, commodity, chemical product, electrical appliance, clothing, car, housing, luxury, or the like, or any combination thereof. In some other embodiments, the product may include a servicing product, a financial product, a knowledge product, an internet product, or the like, or any combination thereof. The internet product may include an individual host product, a web product, a mobile internet product, a commercial host product, an embedded product, or the like, or any combination thereof. The mobile internet product may be used in software of a mobile terminal, a program, a system, or the like, or any combination thereof. The mobile terminal may include a tablet computer, a laptop computer, a mobile phone, a personal digital assistant (PDA), a smart watch, a point of sale (POS) device, an onboard computer, an onboard television, a wearable device, or the like, or any combination thereof. For example, the product may be any software and/or application used in the computer or mobile phone. The software and/or application may relate to socializing, shopping, transporting, entertainment, learning, investment, or the like, or any combination thereof. In some embodiments, the software and/or application related to transportation may include a traveling software and/or application, a vehicle scheduling software and/or application, a mapping software and/or application, etc. In the vehicle scheduling software and/or application, the vehicle may include a horse, a carriage, a rickshaw (e.g., a wheelbarrow, a bike, a tricycle, etc.), a car (e.g., a taxi, a bus, a private car, etc.), a train, a subway, a vessel, an aircraft (e.g., an airplane, a helicopter, a space shuttle, a rocket, a hot-air balloon, etc.), or the like, or any combination thereof.

Figure 2:
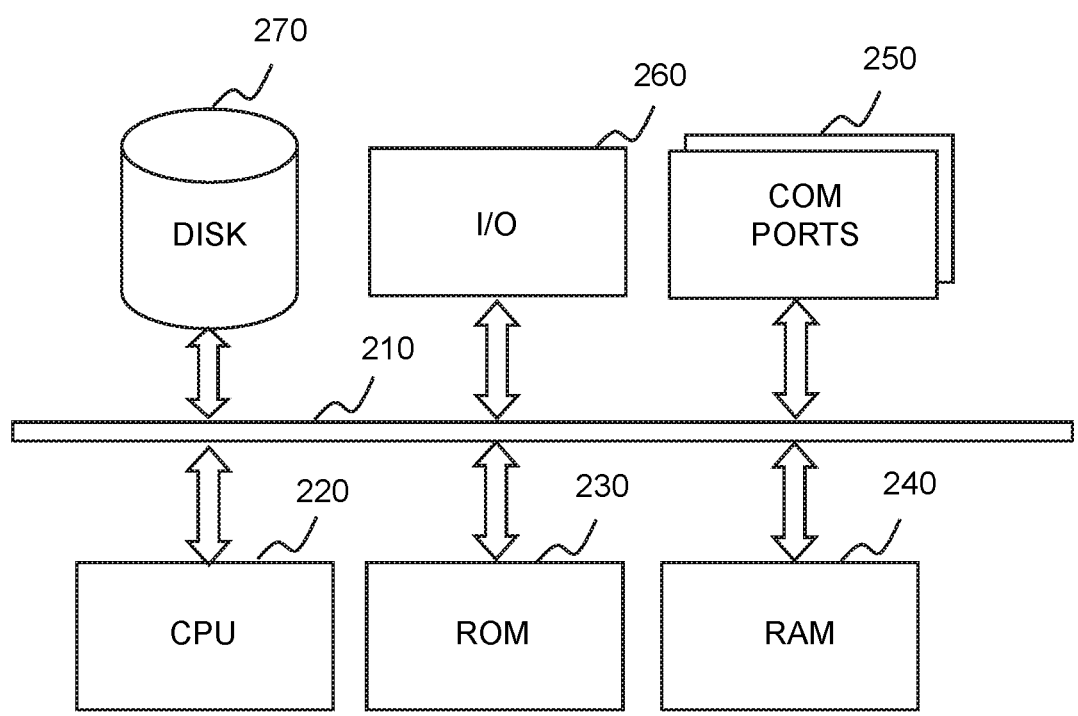
FIG. 2 is a schematic diagram illustrating exemplary hardware and software components of a computing device according to some embodiments.

FIG. 2 is a schematic diagram illustrating exemplary hardware and software components of a computing device 200 on which the server 110, the service requestor terminal 130, and/or the service provider terminal 140 may be implemented according to some embodiments of the present disclosure. For example, the processing engine 112 may be implemented on the computing device 200 and configured to perform functions of the processing engine 112 disclosed in this disclosure.

The computing device 200 may be a general-purpose computer or a special purpose computer; both may be used to implement an online to the offline service system for the present disclosure. The computing device 200 may be used to implement any component of the online-to-offline service as described herein. For example, the processing engine 112 may be implemented on the computing device 200, via its hardware, software program, firmware, or a combination thereof. Although only one such computer is shown, for convenience, the computer functions relating to the online-to-offline service as described herein may be implemented in a distributed fashion on a number of similar platforms, to distribute the processing load.

The computing device 200, for example, may include COM ports 250 connected to and from a network connected thereto to facilitate data communications. The computing device 200 may also include a processor (e.g., the processor 220), in the form of one or more processors, for executing program instructions. The exemplary computing device may include an internal communication bus 210, program storage and data storage of different forms including, for example, a disk 270, and a read-only memory (ROM) 230, or a random access memory (RAM) 240, for various data files to be processed and/or transmitted by the computing device. The exemplary computing device may also include program instructions stored in the ROM 230, RAM 240, and/or another type of non-transitory storage medium to be executed by the processor 220. The methods and/or processes of the present disclosure may be implemented as the program instructions. The computing device 200 also includes an I/O component 260, supporting input/output between the computer and other components. The computing device 200 may also receive programming and data via network communications.

Merely for illustration, only one CPU and/or processor is illustrated in FIG. 2. Multiple CPUs and/or processors are also contemplated; thus operations and/or method steps performed by one CPU and/or processor as described in the present disclosure may also be jointly or separately performed by the multiple CPUs and/or processors. For example, if in the present disclosure the CPU and/or processor of the computing device 200 executes both step A and step B, it should be understood that step A and step B may also be performed by two different CPUs and/or processors jointly or separately in the computing device 200 (e.g., the first processor executes step A and the second processor executes step B, or the first and second processors jointly execute steps A and B).

Figure 3:
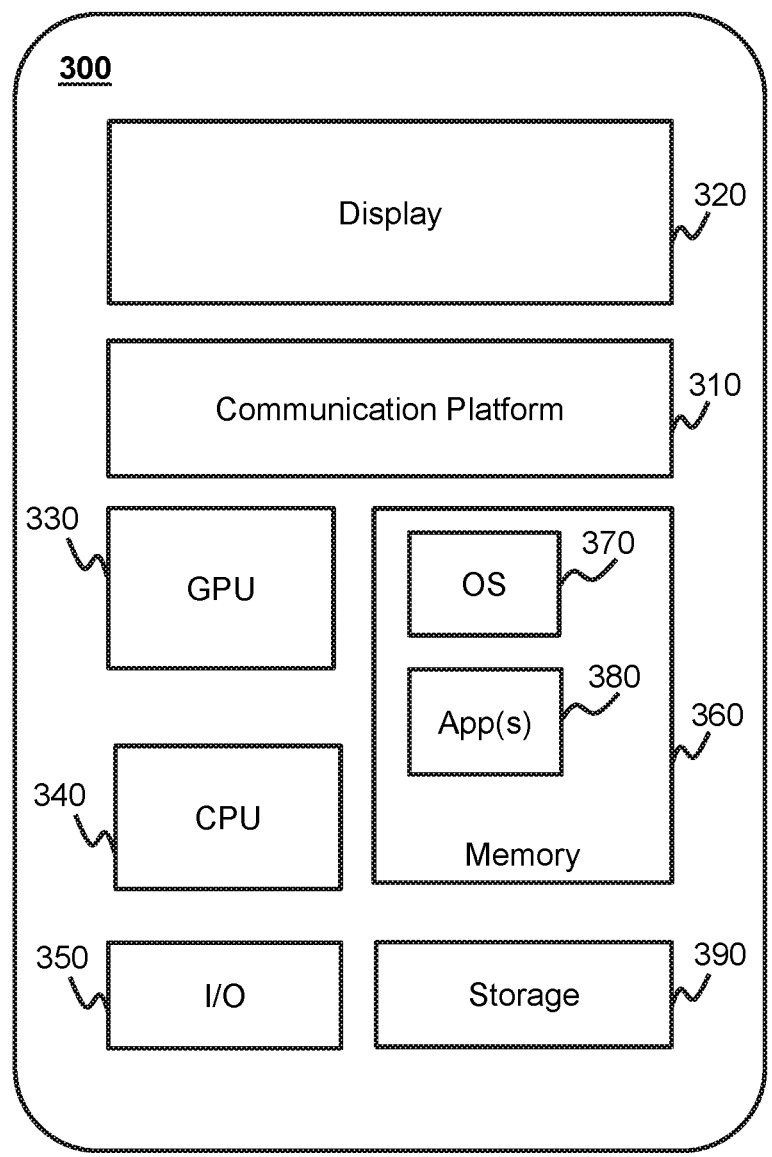
FIG. 3 is a schematic diagram illustrating exemplary hardware and/or software components of a mobile device according to some embodiments of the present disclosure.

FIG. 3 is a schematic diagram illustrating exemplary hardware and/or software components of a mobile device 300 according to some embodiments of the present disclosure. As illustrated in FIG. 3, the mobile device 300 may include a communication module 310, a display 320, a graphics processing unit (GPU) 330, a processor 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™, Windows Phone™) and one or more applications 380 may be loaded into the memory 360 from the storage 390 in order to be executed by the processor 340. The applications 380 may include a browser or any other suitable apps for transmitting, receiving and presenting information relating to the status of the vehicle 150 (e.g., the location of the vehicle 150) from the server 110. User interactions with the information stream may be achieved via the I/O 350 and provided to the server 110 and/or other components of the online-to-offline service system 100 via the network 120.

In some embodiments, one or more operations of processes of following methods may be implemented in the online-to-offline service system 100 illustrated in FIG. 1. For example, the processes of the following methods (e.g., the process 400, the process 500, the process 600, the process 900, the process 1000, the process 1100, the process 1200, the process 1700, and the process 1800) may be stored in the storage device 160 in the form of instructions, and invoked and/or executed by the processing engine 112 (e.g., the processor 220 of the computing device 200 as illustrated in FIG. 2, the processor 340 of the mobile device 300 as illustrated in FIG. 3). The processing engine 112 may perform the operations of the following methods. In another embodiment, at least a portion of each of following systems, terminals, and/or devices (e.g., the detection system 700, the detection system 800, the system 1300, the system 1400, the system 1500, the system 1600, the system 1900, and the processing engine 112) may be implemented on a computing device as illustrated in FIG. 2 or a mobile device as illustrated in FIG. 3.

For more clearly understanding of the above objects, features and advantages of the present disclosure, the present disclosure will be further described in detail below with reference to the drawings and specific embodiments. It should be noted that the embodiments in the present disclosure and the features in the embodiments may be combined with each other without conflict.

In the following description, numerous specific details are set forth in order to provide a thorough understanding of the present disclosure. However, the present disclosure may be practiced otherwise than as described herein. Therefore, the scope of protection of the present disclosure is not limited to the limitations of the specific embodiments disclosed below.

Figure 4:
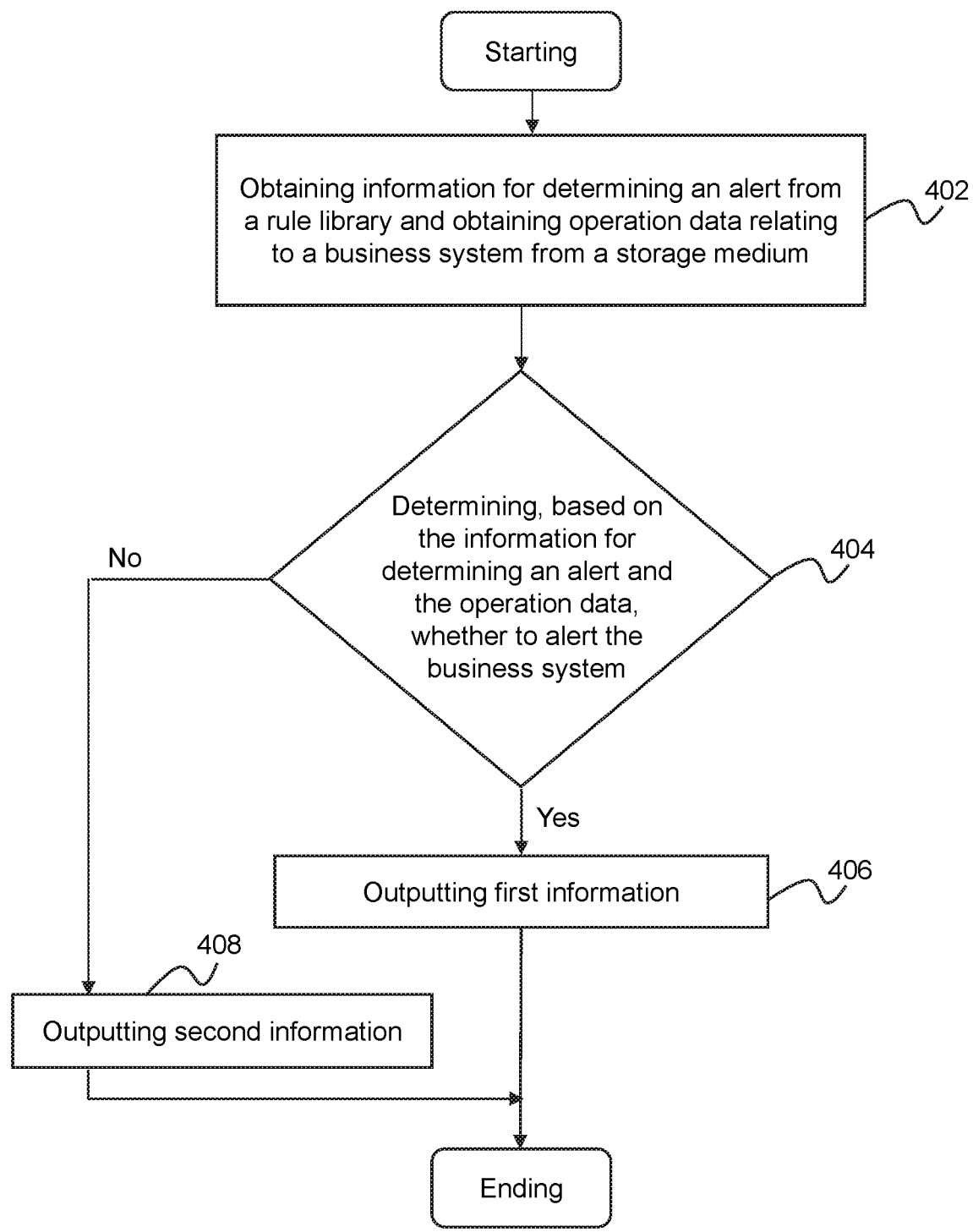
FIG. 4 is a flowchart illustrating an exemplary process for a detection method for a business system according to an embodiment of the present disclosure.

The embodiment of the first aspect of the present disclosure provides a detection method for a business system. FIG. 4 is a flowchart illustrating an exemplary process for a detection method for a business system according to an embodiment of the present disclosure. Wherein, the method includes following operations.

In 402, information for determining alert from a rule library may be obtained and operation data relating to the business system from a storage medium may also be obtained.

In 404, whether to alert the business system may be determined based on the information for determining alert and the operation data.

In 406, if alerting the business system is determined, first information may be outputted.

In 408, if not alerting the business system is determined, second information may be outputted.

The detection method for a business system may be provided by the present disclosure. The business system may include an order system, a Q&A system, a risk control system, a payment system, a vehicle monitoring system, etc. If the processing engine 112 monitors different business systems, the processing engine 112 may obtain corresponding information for determining alert from a rule library relating to the monitored business systems. The information for determining alert may be an alert rule. The operation data relating to the monitored business system may be obtained from a storage medium.

For example, in the vehicle monitoring system, the information for determining alert may include an alert rule for exceeding a speed limit, an alert rule for low-battery of a wireless device, an alert rule for a loss of a signal of a device and an alert rule for a parking period. At the same time, operation data relating to the vehicle monitoring system may be obtained from a storage medium, and whether to alert the business system may be determined based on the information for determining alert and the operation data. If an alert is determined, abnormal information may be outputted. If no alert is determined, normal information may be outputted.

Taking the alert rule for a parking period as an example, the data related to the parking period in the storage medium may include the position data of a vehicle at different time points within a certain time interval. The alert rule for a parking period obtained from the rule library may be: if the processing engine 112 determines that the distance from the location of the vehicle within a preset time to a place is within a preset distance, the processing engine 112 may determine that an alert should be made. If the processing engine 112 determines that the distance from the location of the vehicle within 30 hours to a pawnshop is within 30 meters, the processing engine 112 may determine that the vehicle may be stolen and mortgaged at the pawnshop. Alert may be determined based on the alert rule for a parking period. If the processing engine 112 determines that the distance from the location of the vehicle within 30 hours to the pawnshop is over 30 meters, the processing engine 112 may determine no alert.

In some embodiments, the alert rule for exceeding a speed limit may refer to a situation where: if the processing engine 112 determines that the speed of the vehicle exceeds a speed threshold, the processing engine 112 may determine alert. Hereinafter, "determining alert" refers to the action to determine that an alert should be made. The alert rule for low-battery of a wireless device may refer to a situation where: if the processing engine 112 determines the volume of the battery of a wireless device is lower than a battery threshold, the processing engine 112 may determine alert. The alert rule for a loss of a signal of a device may refer to a situation where: if the processing engine 112 determines that the signal of the device is lost for a predetermined time or the strength of the signal of the device is weaker than a strength threshold, the processing engine 112 may determine alert.

The present disclosure may monitor the business by obtaining the data from the database, and may apply to the business monitoring of multiple business systems. The present disclosure may solve the problem that the business rules are not uniformly managed. Different business rules may result in unified configuration, maintenance and management in the same system. The operation data may include speed data, position data, voltage data, data of strong/weak signals of the device, etc.

It should be noted that, a kind of alert rule for a business system may have different rules according to different situations. Taking the alert for the inventory of service stations (available service stations) in the Q&A system as an example: if the processing engine 112 determines that the average inventory rate of service stations in a city is less than 0.1 on holidays, the processing engine 112 may determine alert; if the processing engine 112 determines that the average inventory rate is less than 1 on non-holidays, the processing engine 112 may determine no alert.

In some embodiments, the service station may provide rental cars. The inventory rate may refer to the ratio of remaining available rental cars to the total number of rental cars.

In addition, the monitoring function and alerting function may be performed through a script, that is, writing the computer code corresponding to the business logic. API (Application Programming Interface) may be invoked for obtaining data from various business systems and integrating and processing the data for determining alert.

Figure 5:
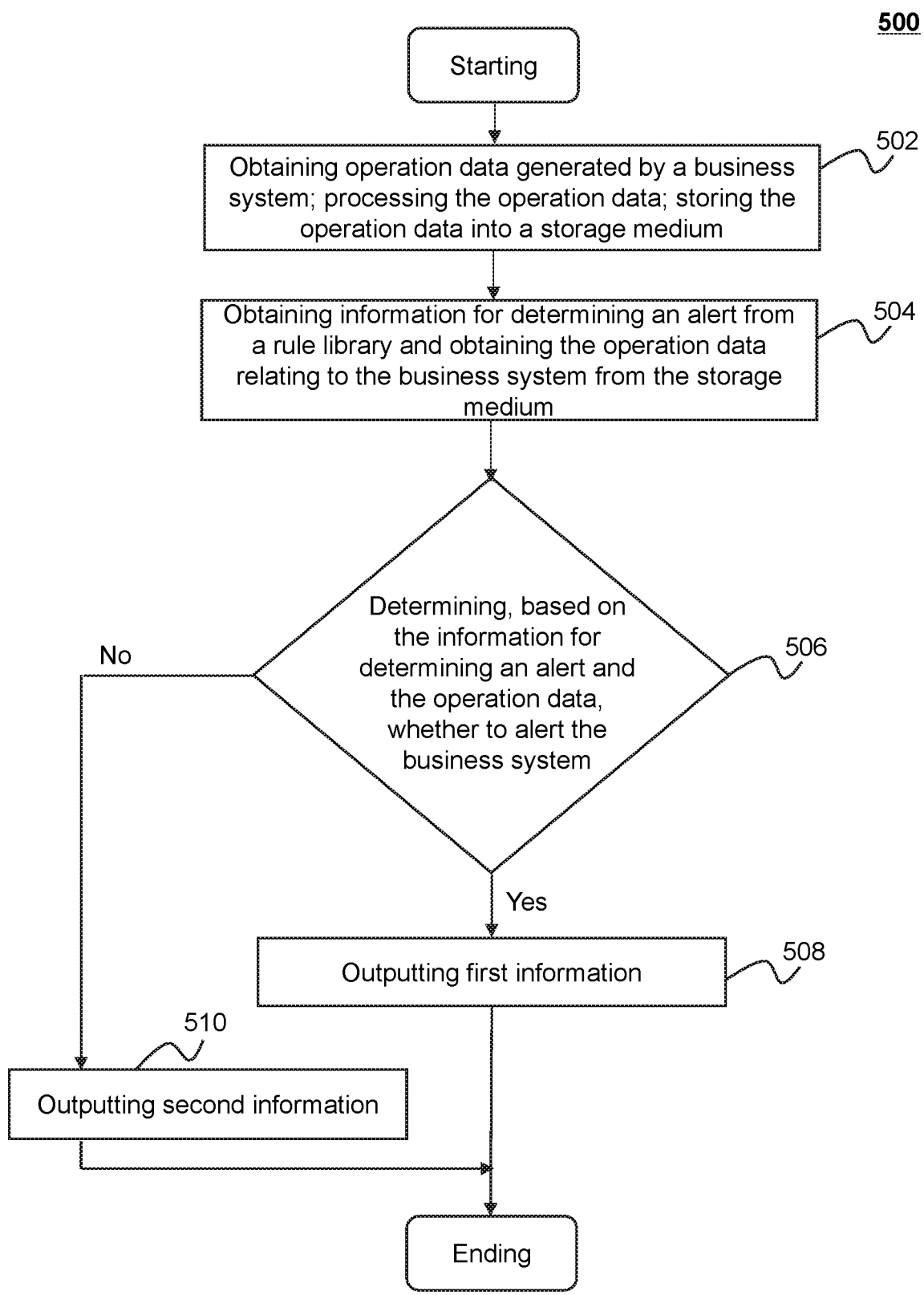
FIG. 5 shows a flowchart illustrating an exemplary process for a detection method for a business system according to another embodiment of the present disclosure.

FIG. 5 shows a flowchart illustrating an exemplary process for a detection method for a business system according to another embodiment of the present disclosure. Wherein, the method include following operations.

In 502, operation data generated by the business system may be obtained, the operation data may be processed, and the operation data may be stored into a storage medium.

In 504, the information for determining alert may be obtained from a rule library; and the operation data relating to the business system may be obtained from the storage medium.

In 506, whether to alert the business system may be determined based on the information for determining alert and the operation data.

In 508, if alerting the business system is determined, first information may be outputted.

In 510, if not alerting the business system is determined, second information may be outputted.

In this embodiment, the operation data generated by the business system may obtained. The operation data may be actively uploaded by the system or collected passively by the system. The operation data that is actively uploaded by the system is in binary form. The passively collected operation data is in a text form, such as a log, etc. The operation data may be collected in real-time or collected at regular time. Further, the operation data generated by the business system may be stored. The operation data may be stored in the form of a service log which is convenient for a dispatching node to access in subsequent use, thereby improving system efficiency. The operation data may be processed. For example, if the processing engine 112 determines that the operation data is position data, the processing engine 112 may calculate the distance and the average speed between different time points based on the position data of the different time points. The operation data may be processed into various forms of data to increase the value of the data.

Figure 6:
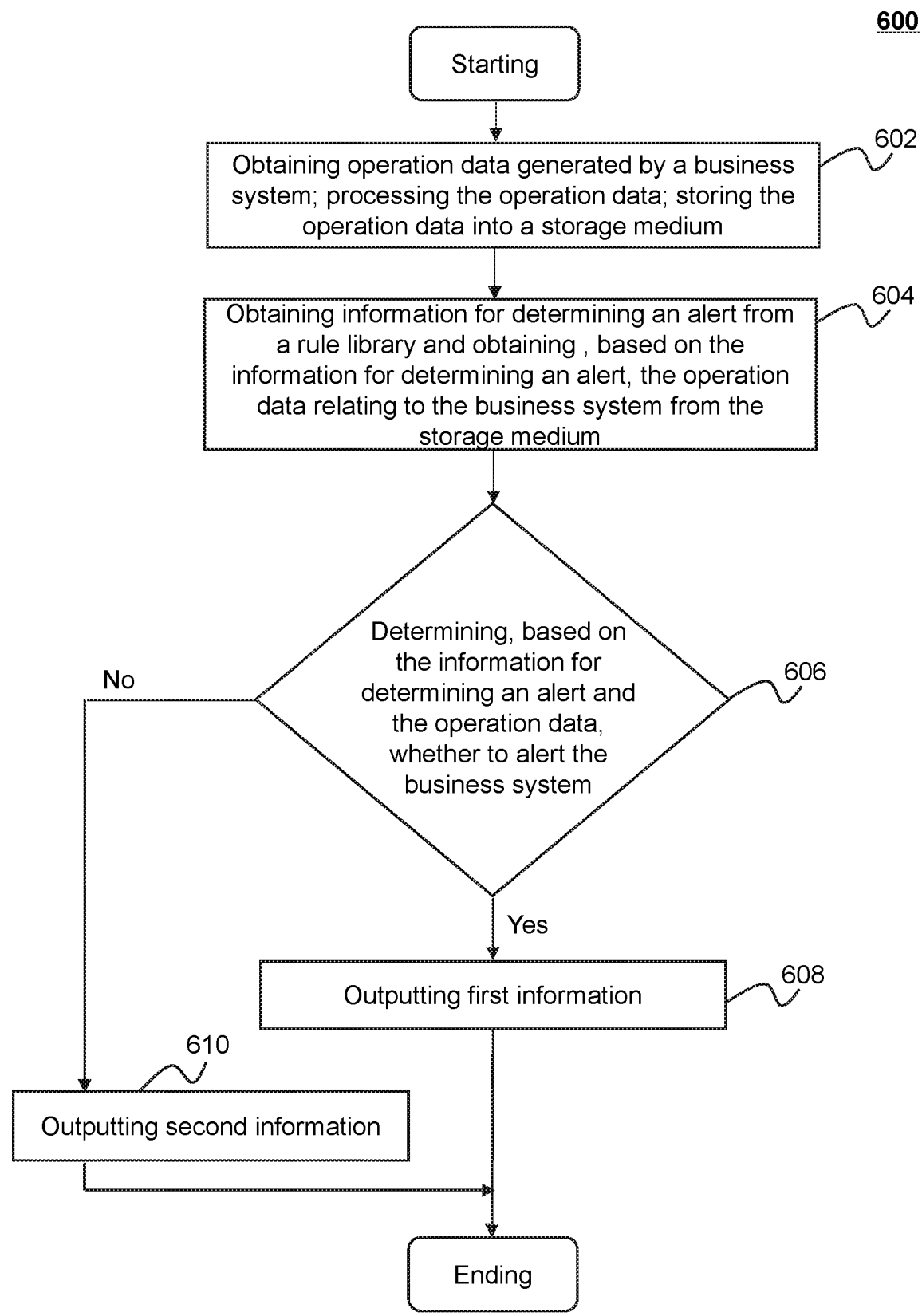
FIG. 6 is a flowchart illustrating an exemplary flowchart for a detection method for a business system according to another embodiment of the present disclosure.

FIG. 6 is a flowchart illustrating an exemplary flowchart for a detection method for a business system according to another embodiment of the present disclosure. Wherein, the method includes the following operations.

In 602, operation data generated by the business system may be obtained; the operation data may be processed; and the operation data may be stored into the storage medium.

In 604, the information for determining alert may be obtained from the rule library; the operation data relating to the business system may be obtained based on the information for determining alert and from the storage medium.

In 606, whether to alert the business system may be determined based on the information for determining alert and the operation data.

In 608, if alerting the business system is determined, first information may be outputted.

In 610, if not alerting the business system is determined, second information may be outputted.

In some embodiments, the information for determining alert may be obtained from the rule library, and the relevant operation data may be obtained from the storage medium based on data required by the information for determining alert. The obtaining method of the operation data may include a sliding window, a fixed interval window, or the like. The sliding window may refer to a window that slides with the pass of time. For example, if the current time is midpoint, the time window may change with the current time passing. The operation data obtained through the sliding window is the operating data retrieved in real-time. The fixed interval window may refer to a window that is fixed for a period. The operation data obtained through the fixed-interval window may refer to the operation data obtained within the period. For example, if the obtained information for determining alert is the alert rule for a parking period, the operation data related to the parking time may be obtained from the storage medium, such as the position data of the vehicle at different time points within a certain time interval. The obtained operation data may relate to the information for determining alert, and an accurate judgment as to whether to alert the system may be determined.

In any aspect of the above technical proposals, preferably, it may further include displaying the first information, the second information, and the operation data in a form of figure and/or chart.

In the technical proposal, the collected operational data may be aggregated and displayed, for example, an average value of voltages in a time period may be displayed or the total number of disassembled alerts in a time period may be displayed. In addition, for a complicated business logic diagram (not a simple aggregation of a single dimension), displayed data may be outputted by preparing the data and processing the data based on business logic.

The disassembled alert may relate to disassembling a part of the vehicle (e.g., a positioning component). Each time a sensor in the vehicle detects an action of disassembling the part of the vehicle, the processing engine 112 may determine a disassembled alert and count. As a result, the processing engine 112 may determine the total number of the disassemble alerts.

In some embodiments, the information for determining alert may include rule information for rules for determining alert. If the processing engine 112 determine, based on the rule information, that the operation data is in accordance with the rules for determining alert. The processing engine 112 may determine alert based on the determination that the operation data is in accordance with the rules for determining alert.

In some embodiments, the information for rules for determining alert may include a range of a business volume measurement, an expected variance, a ratio-range (i.e., a range of a ratio), or the like, or a combination thereof. The range of a business volume measurement may relate to the on-demand service and a current period. The expected variance may relate to the business volume measurement. The ratio-range may relate to orders with dynamically adjusted prices and correspond to a detection period. More descriptions of the information for rules for determining alert can be found elsewhere in the present disclosure (e.g., FIGS. 9-12 and FIGS. 16-17 and the descriptions thereof).

In some embodiments, the operation data may include the business volume measurement, the ratio relating to orders with dynamically adjusted prices, the number count of orders with dynamically adjusted prices, the total number count of orders. More descriptions of the operation data can be found elsewhere in the present disclosure (e.g., FIGS. 9-12 and FIGS. 16-17 and the descriptions thereof).

In some embodiments, the rule for determine alert associated with the range of the business volume measurement may refer to that: if processing engine 112 determines that the business volume measurement is outside the range of the business volume measurement, the processing engine 112 may determine alert. In some embodiments, the rule for determine alert associated with the expected variance may refer to that: if processing engine 112 determines that a difference between the expected variance and an actual variance is larger than a threshold, the processing engine 112 may determine alert. In some embodiments, the rule for determine alert associated with the ratio-range may refer to that: if processing engine 112 determines that the ratio relating to orders with dynamically adjusted prices is outside the ratio-range, the processing engine 112 may determine alert.

Figure 7:
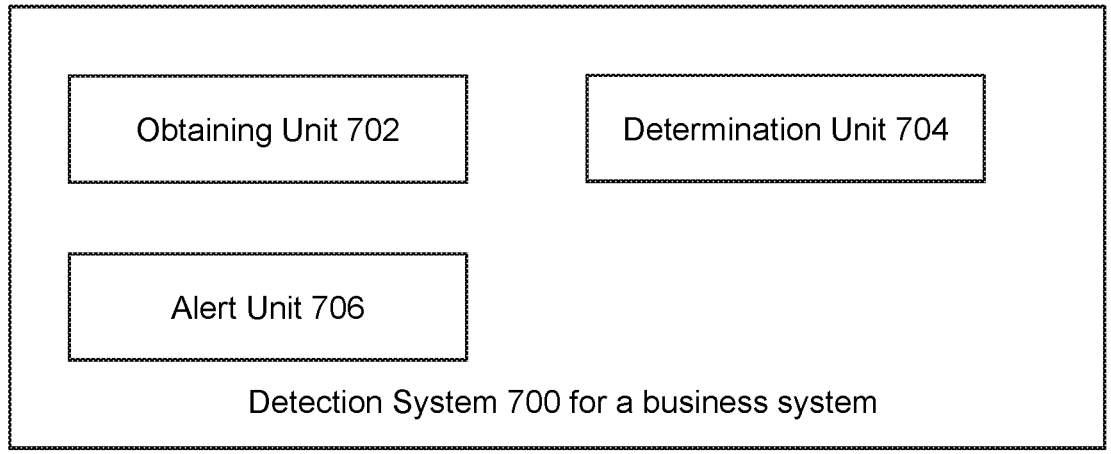
FIG. 7 is a schematic block diagram of a detection system 700 for a business system according to an embodiment of the present disclosure.

An embodiment of a second aspect of the present disclosure may provide a detection system for a business system. FIG. 7 is a schematic block diagram of a detection system 700 for a business system according to an embodiment of the present disclosure. The detection system 700 for a business system may include an obtaining unit 702, a determination unit 704, and an alert unit 706.

The obtaining unit 702 may be configured to obtain information for determining alert from a rule library and operation data relating to the business system from a storage medium.

The determination unit 704 may be configured to determine whether to alert the business system based on the information for determining alert and the operation data.

If alerting the business system is determined, the alert unit 706 may be configured to output first information. If not alerting the business system is determined, the alert unit 706 may be configured to output second information.

The detection system 700 for a business system may be provided by the present disclosure. The business system may include an order system, a Q&A system, a risk control system, a payment system, a vehicle monitoring system, etc. If the processing engine 112 monitors different business systems, the obtaining unit 702 may obtain corresponding information for determining alert from a rule library relating to the monitored business systems. The information for determining alert may be an alert rule. The operation data relating to the monitored business system may be obtained from a storage medium.

For example, in the vehicle monitoring system, the information for determining alert may include an alert rule for exceeding a speed limit, an alert rule for low-battery of a wireless device, an alert rule for a loss of a signal of a device and an alert rule for a parking period. At the same time, operation data relating to the vehicle monitoring system may be obtained from a storage medium, and the determination unit 704 may determine whether to alert the business system based on the information for determining alert and the operation data. If alert is determined, the alert unit 706 may output abnormal information. If no alert is determined, the alert unit 706 may output normal information.

Taking the alert rule for a parking period as an example, the data related to the parking period in the storage medium may include the position data of a vehicle at different time points within a certain time interval. The alert rule for a parking period obtained from the rule library may be: if the processing engine 112 determines that the distance from the location of the vehicle within a preset time to a place is within a preset distance, the processing engine 112 may determine alert. For example, if the processing engine 112 determines that the distance from the location of the vehicle within 30 hours to a pawnshop is within 30 meters, the processing engine 112 may determine that the vehicle may be stolen and mortgaged at the pawnshop. Alert may be determined based on the alert rule for a parking period. If the processing engine 112 determines that the distance from the location of the vehicle within 30 hours to the pawnshop is over 30 meters, the processing engine 112 may determine no alert. The present disclosure may monitor the business by obtaining the data from the database, and may apply to the business monitoring of multiple business systems. The present disclosure may solve the problem that the business rules are not uniformly managed. Different business rules may result in unified configuration, maintenance and management in the same system. The operation data may include speed data, position data, voltage data, data of strong/weak signals of the device, etc.

Figure 8A:
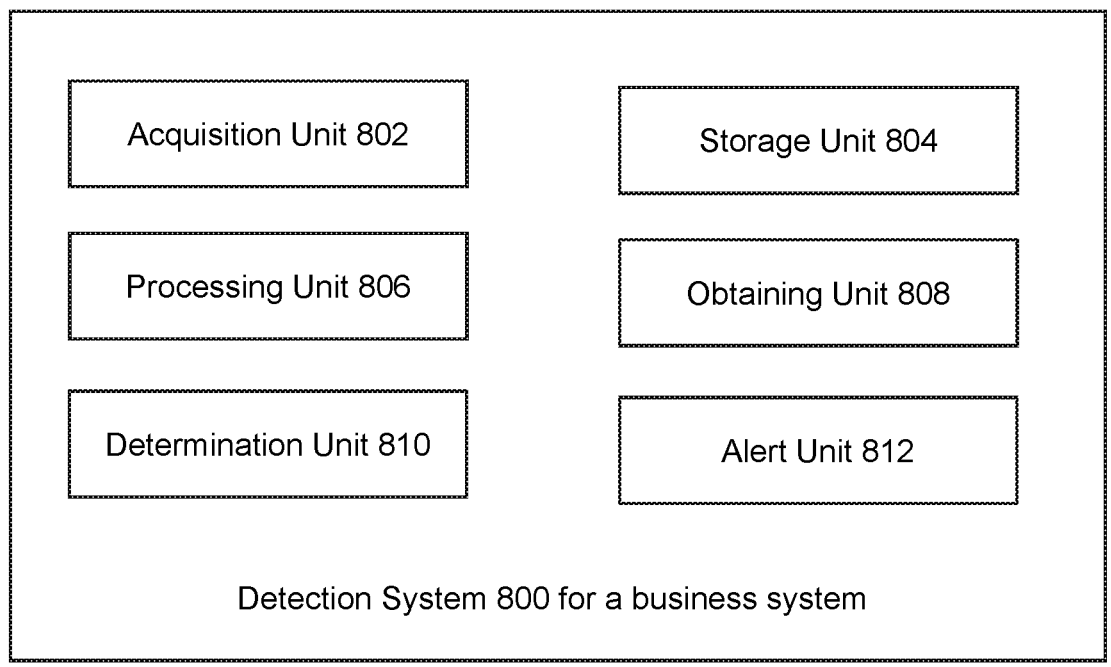
FIG. 8a is a schematic block diagram of detection system 800 for a business system according to another embodiment of the present disclosure.

FIG. 8a is a schematic block diagram of detection system 800 for a business system according to another embodiment of the present disclosure. The detection system 800 for a business system may include an acquisition unit 802, a storage unit 804, a processing unit 806, an obtaining unit 808, a determination unit 810, and an alert unit 812.

The acquisition unit 802 may be configured to obtain operation data generated by the business system.

The storage unit 804 may be configured to store the operation data into a storage medium.

The processing unit 806 may be configured to process the operation data prior to storing the operation data into a storage medium by the storage unit 804.

The obtaining unit 808 may be configured to obtain information for determining alert from a rule library and obtain operation data relating to the business system from a storage medium.

The determination unit 810 may be configured to determine whether to alert the business system based on the information for determining alert and the operation data.

If alerting the business system is determined, the alert unit 812 may be configured to output first information. If not alerting the business system is determined, the alert unit 812 may be configured to output second information.

In this embodiment, the acquisition unit 802 may obtain the operation data generated by the business system. The operation data may be actively uploaded by the system or collected passively by the system. The operation data that is actively uploaded by the system is in binary form. The passively collected operation data is in a text form, such as a log, etc. The operation data may be collected in real-time or collected at regular time. Further, the operation data generated by the business system may be stored. The operation data may be stored in the form of a service log which is convenient for a dispatching node to access in subsequent use, thereby improving system efficiency. The processing unit 806 may process the operation data. For example, if processing unit 806 determines that the operation data is position data, the processing unit 806 may calculate the distance and the average speed between different time points based on the position data of the different time points. The operation data may be processed into various forms of data to increase the value of the data.

In an embodiment of the present disclosure, preferably, the obtaining unit may be specifically configured to obtain the information for determining alert from the rule library; obtain the operation data relating to the business system based on the information for determining alert and from the storage medium.

In some embodiments, the obtaining unit 808 may obtain the information for determining alert from the rule library, and the relevant operation data may be obtained from the storage medium based on data required by the information for determining alert. The obtaining method of the operation data may include a sliding window, a fixed interval window, or the like. The sliding window may refer to a window that slides with time. For example, if the current time is midpoint, the time window may change with the current time passing. The operation data obtained through the sliding window is the operating data retrieved in real-time. The fixed interval window may refer to a window that is fixed for a period of time. The operation data obtained through the fixed-interval window may refer to the operation data obtained within the period of time. For example, if the obtained information for determining alert is the alert rule for a parking period, the operation data related to the parking time may be obtained from the storage medium, such as the position data of the vehicle at different time points within a certain time interval. The obtained operation data may relate to the information for determining alert, and a precise determination as to whether to alert the system may be made.

Figure 8B:
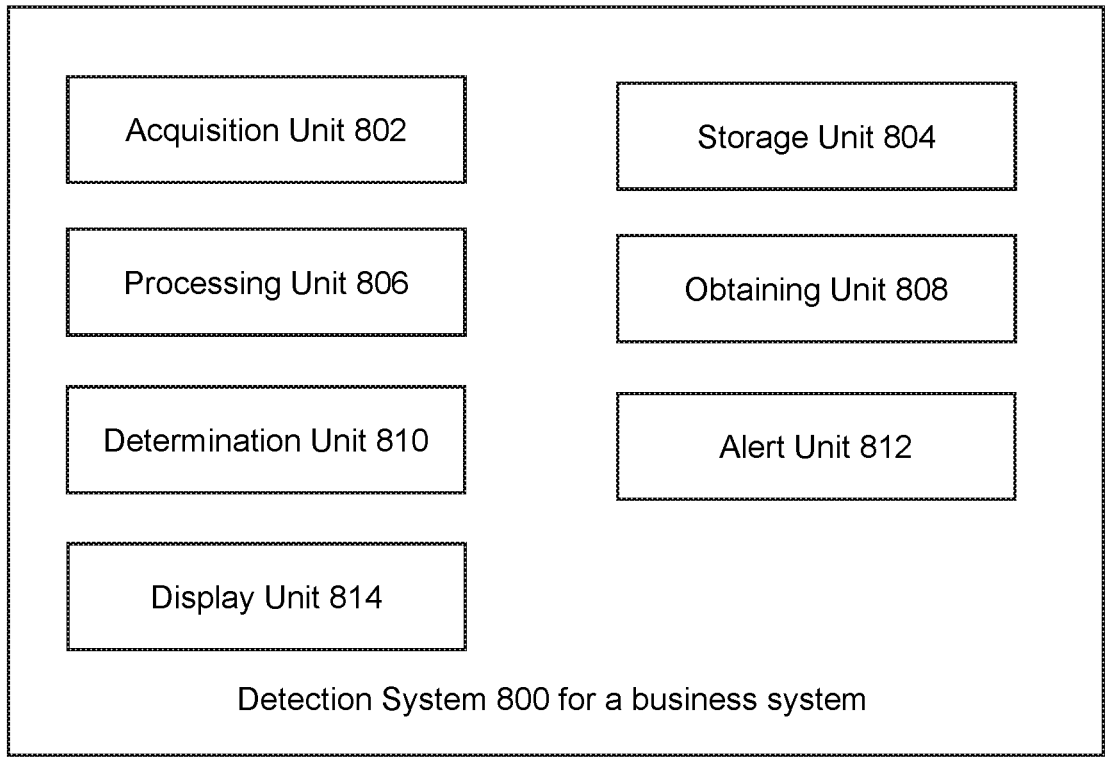
FIG. 8b is a schematic block diagram of detection system 800 for a business system according to another embodiment of the present disclosure.

FIG. 8b is a schematic block diagram of detection system 800 for a business system according to another embodiment of the present disclosure. The detection system 800 for a business system may include an acquisition unit 802, a storage unit 804, a processing unit 806, an obtaining unit 808, a determination unit 810, an alert unit 812, and a display unit 814.

The acquisition unit 802 may be configured to obtain operation data generated by the business system.

The storage unit 804 may be configured to store the operation data into a storage medium.

The processing unit 806 may be configured to process the operation data prior to storing the operation data into a storage medium by the storage unit 804.

The obtaining unit 808 may be configured to obtain information for determining alert from a rule library and obtain operation data relating to the business system from a storage medium.

The determination unit 810 may be configured to determine whether to alert the business system based on the information for determining alert and the operation data.

If alerting the business system is determined, the alert unit 812 may be configured to output first information. If not alerting the business system is determined, the alert unit 812 may be configured to output second information.

The display unit may be configured to display operation data, the first information, and the second information in a form of figure and/or chart In the technical proposal, the collected operational data may be aggregated and displayed, for example, an average value of voltages in a time period may be displayed or the total number of disassembled alerts in a time period may be displayed. In addition, for a complicated business logic diagram (not a simple aggregation of a single dimension), displayed data may be outputted by preparing the data and processing the data based on business logic.

Figure 9:
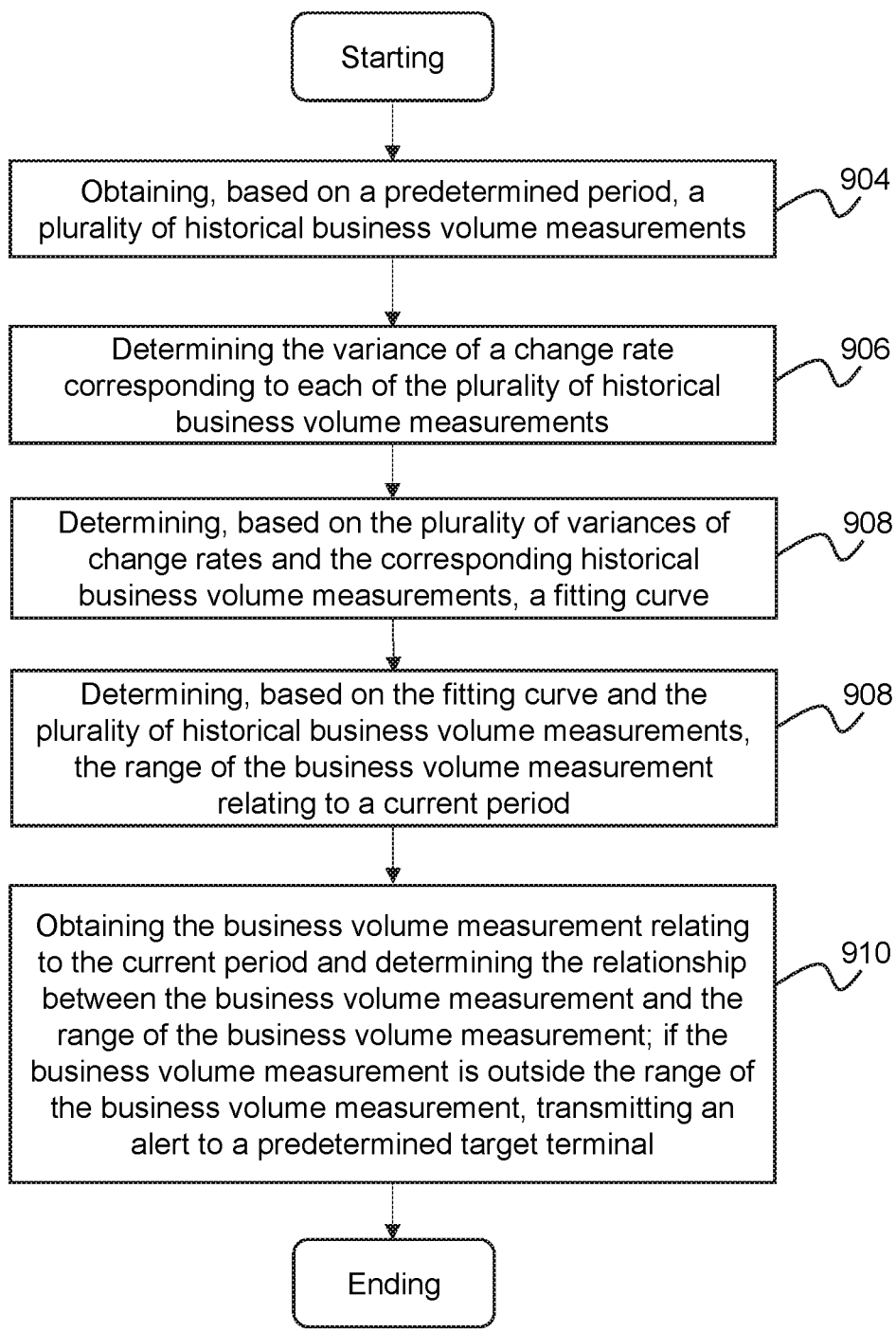
FIG. 9 is a flowchart for illustrating an exemplary process for a method for monitoring business volume according to an embodiment of the present disclosure.

FIG. 9 is a flowchart for illustrating an exemplary process for a method for monitoring business volume according to an embodiment of the present disclosure.

As shown in FIG. 9, the method for monitoring business volume according to an embodiment of the present disclosure may include following operations.

In 902, a plurality of historical business volume measurements may be obtained based on a predetermined period.

In 904, a variance of a change rate may be determined. The variance of the change rate may correspond to each of the plurality of historical business volume measurements.

In 906, a fitting curve may be determined based on the plurality of variances of change rates and the corresponding historical business volume measurements.

In 908, a range of business volume measurement relating to a current period may be determined based on the fitting curve and the plurality of historical business volume measurements.

In 910, a business volume measurement relating to the current period may be obtained and a relationship between the business volume measurement and the range of the business volume measurement may be determined. If the processing engine 112 determines that the business volume measurement is outside the range of the business volume measurement, the processing engine 112 may transmit alert to a predetermined target terminal.

First, a plurality of historical business volume measurements may be obtained based on a predetermined period. For example, the historical business volume measurement may be obtained once every minute or once every second, thereby a plurality of historical business volume measurements may be obtained in a time period. It should be understood that the more the historical business volume measurements are obtained, the more accurate the monitoring of the business volume is. The variance of the change rate corresponding to each of the plurality of historical business volume measurements may be calculated to obtain the degree of the deviation relating to each historical business volume measurement. Taking the historical business volume measurement as a horizontal axis and the variance as a vertical axis, the processing engine 112 may obtain a scatter diagram. The fitting curve may be determined based on the scatter diagram. A variance corresponding to each historical business volume measurement may be determined based on the fitting curve and the each historical business volume measurement. Thereby, a range of business volume measurement relating to a current period may be determined. The business volume measurement relating to the current period may be obtained and the relationship between the business volume measurement and the range of the business volume measurement may be determined. If the processing engine 112 determines that the business volume measurement relating to the current period is outside the range of the business volume measurement relating to the current period, the processing engine 112 may determine that the user cannot use the platform normally and the platform server may be abnormal. The processing engine 112 may remind an operation and maintenance personnel of timely handling the abnormalities by transmitting alert to a terminal of a predetermined target. The operation status of the platform may be monitored by monitoring the business volume measurement relating to the current preset period. If the processing engine 112 determines an abnormality, the processing engine 112 may transmit alert to a terminal of a predetermined target automatically. Through the alert, an engineer and the operation and maintenance personnel may immediately notice the abnormality of the business volume measurement. It may be possible to discover, understand, analyze, and restrain the abnormality of business volume measurement timely. The stability of the platform may be improved.

It should be noted that the kind of the business volume measurement may include but not limited to an order volume, a trading volume, and a number count of online users. For example, the trading volume of the e-commerce platform may be monitored and the number count of online users of a live broadcasting platform may be monitored, etc. Different kinds of business volume measurements may be analyzed to improve the stability of the platform during operation.

It should also be noted that the target terminal may be a device via which the platform operation and maintenance personnel may obtain alert at any time. The device may include a cell phone, a working computer, or an alert device carried by the platform operation and maintenance personnel (i.e. managers of the system).

It should be understood that the same historical business volume measurement may correspond to multiple variances, and the maximum variance may correspond to a normal range of business volume measurement. Therefore, the maximum value of the variance may be used to determine the fitting curve.

Figure 10:
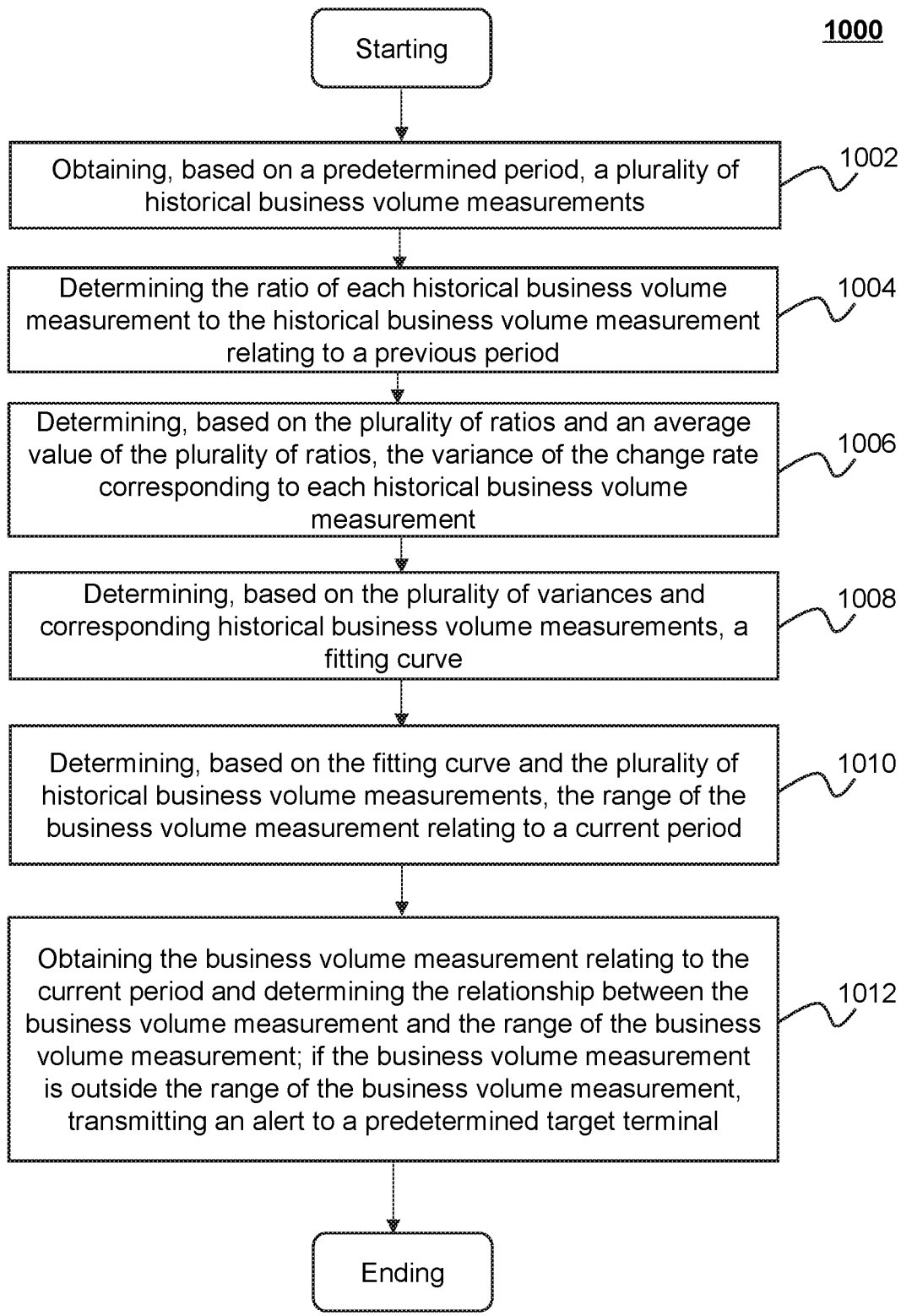
FIG. 10 is a flowchart illustrating an exemplary process for a method for monitoring business volume according to an embodiment of the present disclosure.

FIG. 10 is a flowchart illustrating an exemplary process for a method for monitoring business volume according to an embodiment of the present disclosure.

As shown in FIG. 10, the method for monitoring business volume according to an embodiment of the present disclosure may include following operations.

In 1002, a plurality of historical business volume measurements may be obtained based on a predetermined period.

In 1004, a ratio of each historical business volume measurement to a historical business volume measurement relating to a previous period may be determined. The ratio may correspond to the change rate.

In 1006, the variance of the change rate corresponding to each historical business volume measurement may be determined based on the plurality of ratios and the average value of the plurality of ratios.

In 1008, a fitting curve may be determined based on the plurality of variances of the change rates and the corresponding historical business volume measurements.

In 1010, a range of business volume measurement relating to the current period may be determined based on the fitting curve and the plurality of historical business volume measurements.

In 1012, a business volume measurement relating to the current period may be obtained and a relationship between the business volume measurement and the range of the business volume measurement may be determined. If the processing engine 112 determines that the business volume measurement is outside the range of the business volume measurement, the processing engine 112 may transmit alert to a predetermined target terminal.

First, the ratio of historical business volume measurement at k time point to historical business volume measurement at k−1 time point may be obtained, and the ratio of historical business volume measurement at k−1 time point to historical business volume measurement at k−2 time point may also be obtained, and so on. The ratio of each historical business volume measurement to a historical business volume measurement relating to a previous period may be determined. The time interval between k time point and k−1 time point, between k−1 time point and k−2 time point may be the predetermined period. It should be understood that the historical business volume measurement at k time point may be larger than or less than the historical business volume measurement at k−1 time point. Therefore, the ratio may be centered on 1 and fluctuate up and down. The ratio may be the ratio. There may be a plurality of historical business volume measurements, so there may be a plurality of ratios. The variance of all the ratios may be calculated. The variance of all the rations may correspond to the variance of the ratios relating to the plurality of historical business volume measurements. The method for calculating the variance may include calculating the average value of the square sum of the difference between each ratio and the average value of the ratios. The average value of the square sum may be designated as the variance of the changes rates. The degree of deviation of each historical business volume measurement may be determined. The ratio may correspond to the change rate.

In some embodiments, for each historical business volume measurement, the processing engine 112 may determine a reference period relating to the historical business volume measurement. The processing engine 112 may obtain a plurality of target historical business volume measurements relating to periods before the reference period. The processing engine 112 may designate two adjacent target historical business volume measurements in time as a group. As a result, the processing engine 112 may determine a plurality of groups. For each group, the processing engine 112 may determine a change rate of the posterior target historical business volume measurement to the previous target historical business volume measurement. The processing engine 112 may determine a plurality of change rates for the plurality of groups. The processing engine 112 may determine an average value of the plurality of change rates. The processing engine 112 may then determine, based on the plurality of change rates and the average value, the variance of change rate corresponding to the each historical business volume measurement. For the plurality of historical business measurements, the processing engine 112 may determine a plurality of variances of change rates.

Figure 11:
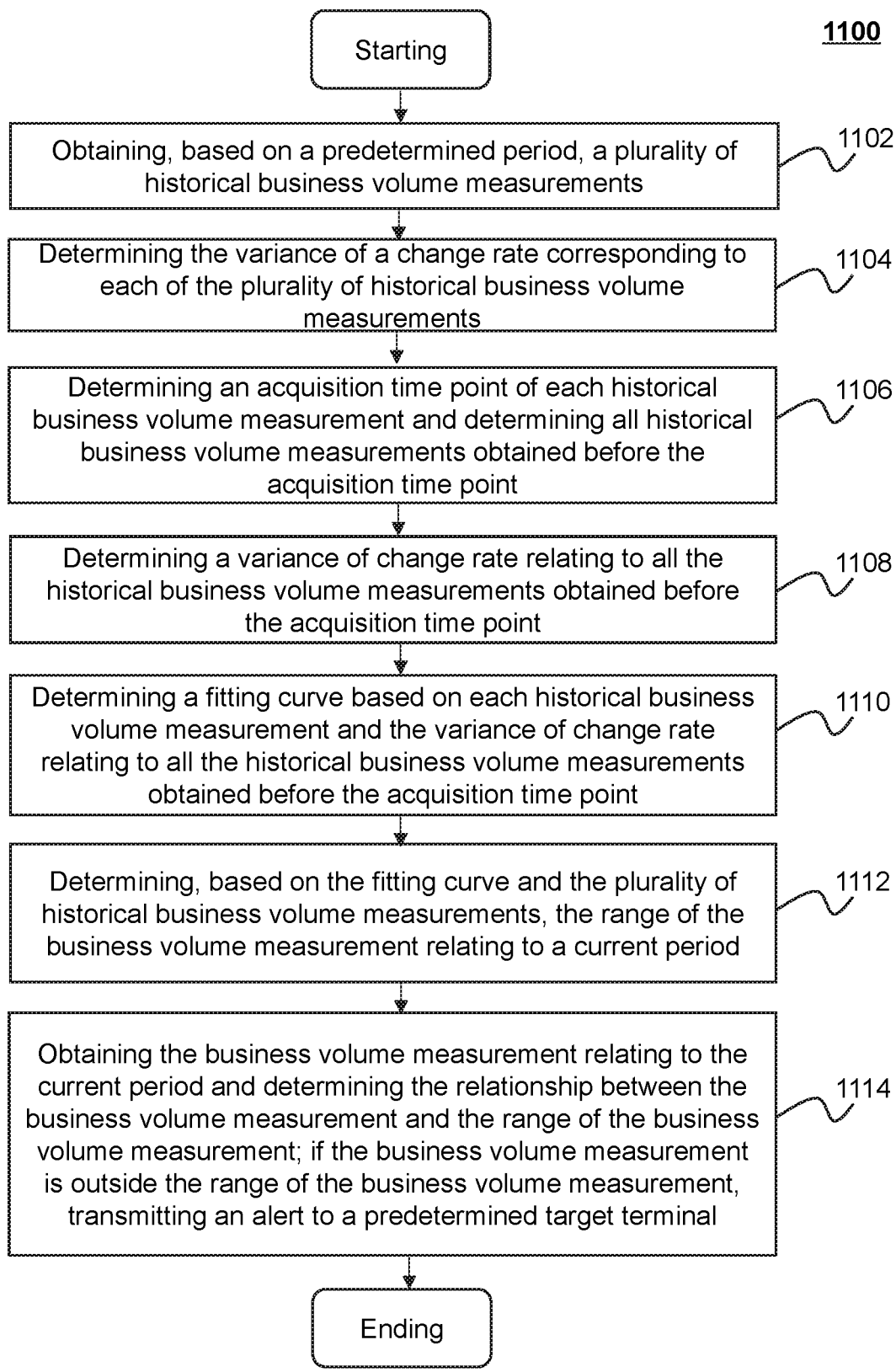
FIG. 11 is a flowchart illustrating an exemplary process for a method for monitoring business volume according to an embodiment of the present disclosure.

FIG. 11 is a flowchart illustrating an exemplary process for a method for monitoring business volume according to an embodiment of the present disclosure.

As shown in FIG. 11, the method for monitoring business volume according to an embodiment of the present disclosure may include following operations.

In 1102, a plurality of historical business volume measurements may be obtained based on a predetermined period.

In 1104, a variance of a change rate may be determined. The variance of the change rate may correspond to each of the plurality of historical business volume measurements.

In 1106, an acquisition time point of each historical business volume measurement may be determined. All historical business volume measurements obtained before the acquisition time point may be determined.

In 1108, a variance of change rate relating to all the historical business volume measurements obtained before the acquisition time point may be determined.

In 1110, a fitting curve may be determined based on each historical business volume measurement and the variance of change rate relating to all the historical business volume measurements obtained before the acquisition time point.

In 1112, a range of business volume measurement relating to a current period may be determined based on the fitting curve and the plurality of historical business volume measurements.

In 1114, a business volume measurement relating to the current period may be obtained and a relationship between the business volume measurement and the range of the business volume measurement may be determined. If the processing engine 112 determines that the business volume measurement is outside the range of the business volume measurement, the processing engine 112 may transmit alert to a predetermined target terminal.

Wherein, the function of the fitting curve may be $y=0.1859e^{-0.005x}$, wherein x represents a historical business volume measurement, y represents the variance of change rate corresponding to the historical business volume measurement.

First, the acquisition time point of each historical business volume measurement may be obtained. For example, every one minute after a current time point may be the acquisition time. A historical business volume measurement may be obtained at the acquisition time. All historical business volume measurements obtained before the acquisition time point may be determined. A variance of the change rate relating to all the historical business volume measurements obtained before the acquisition time point may be determined. The more historical business volume measurements obtained before the acquisition time, the more precisely the obtained variance reflecting the range of the business volume measurement of a current period under normal conditions. Finally, the fitting curve may be determined based on each historical business volume measurement and the variance of change rate relating to all the historical business volume measurements obtained before the acquisition time point. Thereby, the variance of the corresponding business volume measurement may be determined based on the fitting curve and the corresponding business volume measurement relating to the current period. The function of the fitting curve may be $y=0.1859e^{-0.005x}$. According to the function, the greater the historical business volume measurement, the smaller the variance of change rate corresponding to the historical business volume measurement. In the actual application, with the same variation, the greater the historical business volume measurement, the smaller the obtained change rate of the historical business volume measurement, and the smaller the variance of change rate relating to the historical business volume measurement, which is consistent with the rule reflected by the function.

The specific method for determining the fitting curve may be: taking historical business volume measurement as the horizontal axis and the variance as the vertical axis, obtaining scatter diagram; adopting the maximum value of the variance and using the envelope curve to describe the characteristics of the scatter diagram, the fitting curve may be determined by fitting the envelope curve. It should be noted that there are many mathematical methods for fitting the envelope curve, which may be selected based on specific conditions.

Figure 12:
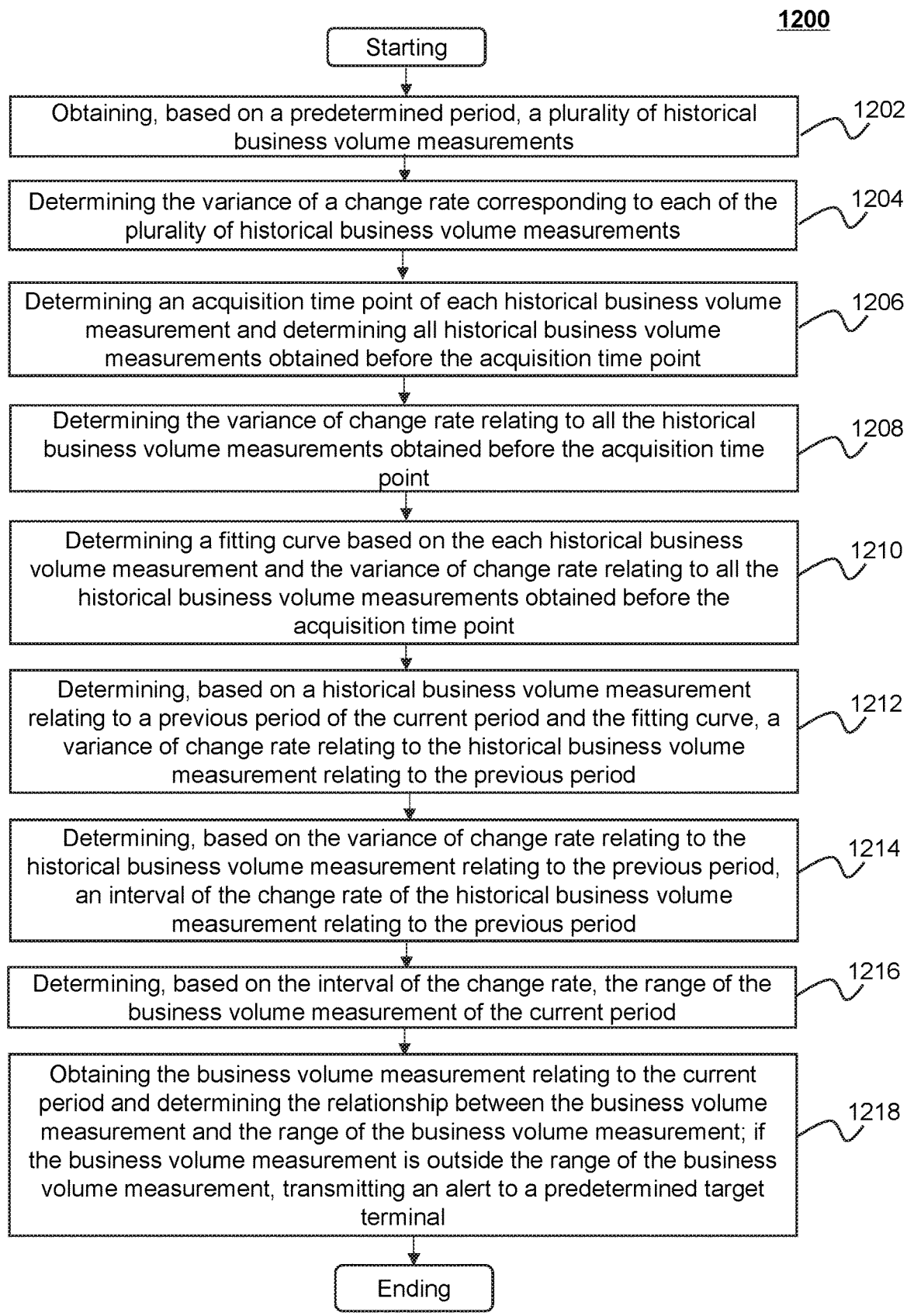
FIG. 12 is a flowchart illustrating an exemplary process for a method for monitoring business volume according to an embodiment of the present disclosure.

FIG. 12 is a flowchart illustrating an exemplary process for a method for monitoring business volume according to an embodiment of the present disclosure.

As shown in FIG. 12, the method for monitoring business volume according to an embodiment of the present disclosure may include following operations.

In 1202, a plurality of historical business volume measurements may be obtained based on a predetermined period.

In 1204, a variance of a change rate may be determined. The variance of the change rate may correspond to each of the plurality of historical business volume measurements.

In 1206, an acquisition time point of each historical business volume measurement may be determined. All historical business volume measurements obtained before the acquisition time point may be determined.

In 1208, a variance of change rate relating to all the historical business volume measurements obtained before the acquisition time point may be determined.

In 1210, a fitting curve may be determined based on each historical business volume measurement and the variance of change rate relating to all the historical business volume measurements obtained before the acquisition time point In 1212, a variance of change rate of the historical business volume measurement relating to the previous period may be determined based on a historical business volume measurement relating to a previous period of the current period and the fitting curve.

In 1214, an interval of the change rate of the historical business volume measurement relating to the previous period may be determined based on the variance of change rate relating to the historical business volume measurement relating to the previous period. In some embodiments, the method for determining the interval of the change rate may include mathematical approaches (e.g., interval estimation).

In 1216, the range of the business volume measurement of the current period may be determined based on the interval of the change rate.

In 1218, a business volume measurement relating to the current period may be obtained and a relationship between the business volume measurement and the range of the business volume measurement may be determined. If the processing engine 112 determines that the business volume measurement is outside the range of the business volume measurement, the processing engine 112 may transmit alert to a predetermined target terminal.

Wherein, the interval of the change rate is: $[1-\sqrt{0.1859e^{-0.005x_{k-1}}}, 1+\sqrt{0.1859e^{-0.005x_{k-1}}}]$ Wherein $x_{k-1}$ is the historical business volume measurement obtained in the previous period.

The variance of change rate of the historical business volume measurement relating to the previous period may be determined based on a historical business volume measurement relating to a previous period of the current period and the fitting curve. The method for calculating the variance of change rates may include calculating the average value of the square sum of the difference between each change rate and the average value of the change rates. The average value of the square sum may be designated as the variance of the changes rates. The average value of the change rates may be 1. The variance may be obtained based on the change rates and 1. The variance to may be used to reversely derive the upper limit and lower limit relating to the change rate of orders. The upper limit and lower limit may be $[1-\sqrt{0.1859e^{-0.005x_{k-1}}}, 1+\sqrt{0.1859e^{-0.005x_{k-1}}}]$. Obviously, the range of the business volume measurement of the current period may be obtained based on the upper limit and the lower limit of the variance of change rate relating to the historical business volume measurement relating to the previous period. In the Equation, $x_{k-1}$ is the historical business volume measurement obtained in the previous period. That is, an interval of the business volume measurement relating to the current period under normal conditions may be determined based on the historical business volume measurement relating to the previous period.

Taking the volume of car hailing as an example, several sets of data may be obtained based on the above function, as shown in Table 1. If the processing engine 112 determines that the historical business volume measurement obtained in the previous period is 400, the processing engine 112 may determine, based on the function of the interval of the change rate, that the corresponding range of the change rate is: [0.841385, 1.158615]. The range of the business volume measurement of the current period may be [400×0.841385, 400×1.158615], that is, the range of the business volume measurement of the current period may be between 336 and 463. If the processing engine 112 determines that the business volume measurement relating to the current period is outside the range, the processing engine 112 may determine that the platform server is abnormal. The processing engine 112 may remind the operation and maintenance personnel (i.e. managers of the system) of timely handling abnormalities by transmitting alert to the terminal of the predetermined target.

TABLE 1

| Number Count of Orders | Lower Limit | Upper Limit |
|---|---|---|
| 20 | 0.589867 | 1.410133 |
| 50 | 0.619502 | 1.380498 |
| 200 | 0.738487 | 1.261513 |
| 300 | 0.796334 | 1.203666 |
| 400 | 0.841385 | 1.158615 |
| 550 | 0.890985 | 1.109015 |
| 650 | 0.915099 | 1.084901 |
| 759 | 0.93535 | 1.06465 |

In some embodiments, the processing engine 112 may obtain the business volume measurement relating to the current period. The processing engine 112 may determine an expected variance relating to the current period based on the fitting curve and the business volume measurement relating to the current period. The processing engine 112 may also obtain all the historical business volume measurements made in historical periods corresponding to and/or before the current period. The processing engine 112 may determine an actual variance of change rates relating to all the historical business volume measurements. The processing engine 112 may determine a difference between the expected variance and the actual variance. The processing engine 112 may determine whether the difference is larger than a threshold. The processing engine 112 may determine alert in response to the determination that the difference is larger than the threshold. For example, the processing engine 112 may remind the operation and maintenance personnel of timely handling abnormalities by transmitting alert to the terminal of the predetermined target.

In some embodiments, for a business volume measurement relating to a current period, the processing engine 112 may determine a plurality of historical business volume measurements. The processing engine 112 may determine a variance of change rate corresponding to each of the plurality of historical business volume measurements. The processing engine 112 may determine a fitting curve based on the plurality of variances of change rates and the corresponding plurality of historical business volume measurements.

The processing engine 112 may determine an expected range of business volume measurement of the current period based on the fitting curve and a previous historical business volume measurement. The previous historical business volume measurement may refer to the business volume measurement relating to the previous period of the current period. If the processing engine 112 determines that the business volume measurement relating to the current period is outside the expected range of business volume measurement of the current period, the processing engine 112 may determine alert.

For determining the expected range of business volume measurement of the current period, the processing engine 112 may determine, based on the previous historical business volume measurement and the fitting curve, a previous variance of change rate of the previous historical business volume measurement. The processing engine 112 may determine, based on the previous variance of change rate, a previous interval of the change rate of the previous historical business volume measurement. The processing engine 112 may determine, based on the previous interval of the change rate, the expected range of business volume measurement of the current period.

In some embodiments, as described in connection with FIGS. 4-6, the range of business volume measurement relating to the current period and/or the expected variance relating to the current period may be a specific embodiment of the information for rules for determining alert; the business volume measurement relating to the current period and/or the actual variance of change rate thereof may be a specific embodiment of the operation data. If the processing engine 112 determines that the business volume measurement relating to the current period is outside the range of business volume measurement relating to the current period, the processing engine 112 may determine alert. If the processing engine 112 determines that the difference between the expected variance and the actual variance of change rate is larger than a threshold, the processing engine 112 may determine alert.

Figure 13:
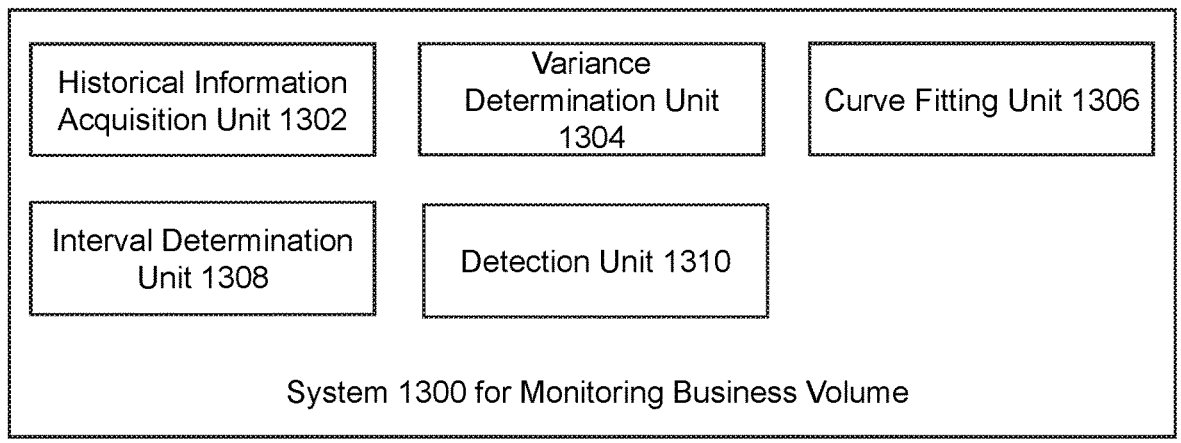
FIG. 13 is a schematic block diagram of a system 1300 for monitoring business volume according to an embodiment of the present disclosure.

FIG. 13 is a schematic block diagram of a system 1300 for monitoring business volume according to an embodiment of the present disclosure. The system 1300 for monitoring business volume may include a historical information acquisition unit 1302, a variance determination unit 1304, a curve fitting unit 1306, an interval determination unit 1308, and a detection unit 1310.

The historical information acquisition unit 1302 may be configured to obtain a plurality of historical business volume measurements based on a predetermined period.

The variance determination unit 1304 may be configured to determine a variance of a change rate. The variance of the change rate may correspond to each of the plurality of historical business volume measurements.

The curve fitting unit 1306 may be configured to determine a fitting curve based on the plurality of variances of change rates and the corresponding historical business volume measurements.

The interval determination unit 1308 may be configured to determine a range of business volume measurement relating to a current period based on the fitting curve and the plurality of historical business volume measurements.

The detection unit 1310 may be configured to obtain a business volume measurement relating to the current period and determine a relationship between the business volume measurement and the range of the business volume measurement. If the detection unit 1310 determines that the business volume measurement is outside the range of the business volume measurement, the detection unit 1310 may transmit alert to a predetermined target terminal.

First, a plurality of historical business volume measurements may be obtained based on a predetermined period. For example, the historical business volume measurement may be obtained every minute or every second, thereby a plurality of historical business volume measurements may be obtained in a time period. It should be understood that the more the historical business volume measurements are obtained, the more accurate the monitoring of the business volume is. The variance of the change rate corresponding to each of the plurality of historical business volume measurements may be calculated to obtain the degree of the deviation relating to each historical business volume measurement. Taking the historical business volume measurement as a horizontal axis and the variance as a vertical axis, the processing engine 112 may obtain a scatter diagram. The fitting curve may be determined based on the scatter diagram. A variance corresponding to each historical business volume measurement may be determined based on the fitting curve and the each historical business volume measurement. Thereby, a range of business volume measurement relating to a current period may be determined. The business volume measurement relating to the current period may be obtained and the relationship between the business volume measurement and the range of the business volume measurement may be determined. If the processing engine 112 determines that the business volume measurement relating to the current period is outside the range of the business volume measurement relating to the current period, the processing engine 112 may determine that the user cannot use the platform normally and the platform server may be abnormal. The processing engine 112 may remind an operation and maintenance personnel of timely handling the abnormalities by transmitting alert to a terminal of a predetermined target. The operation status of the platform may be monitored by monitoring the business volume measurement relating to the current preset period. If the processing engine 112 determines an abnormality, the processing engine 112 may transmit alert to a terminal of a predetermined target automatically. Through the alert, an engineer and the operation and maintenance personnel may immediately notice the abnormality of the business volume measurement. It may be possible to discover, understand, analyze, and restrain the abnormality of business volume measurement timely. The stability of the platform may be improved.

It should be noted that the kind of the business volume measurement may include but not limited to, an order volume, a trading volume, and a number count of online users. For example, the trading volume of the e-commerce platform may be monitored and the number count of online users of a live broadcasting platform may be monitored, etc. Different kinds of business volume measurements may be analyzed to improve the stability of the platform during operation.

It should also be noted that the target terminal may be a device via which the platform operation and maintenance personnel may obtain alert at any time. The device may include a cell phone, a working computer, or an alert device carried by the platform operation and maintenance personnel.

It should be understood that the same historical business volume measurement may correspond to multiple variances, and the maximum variance may correspond to a normal range of business volume measurement. Therefore, the maximum value of the variance may be used to determine the fitting curve.

Figure 14:
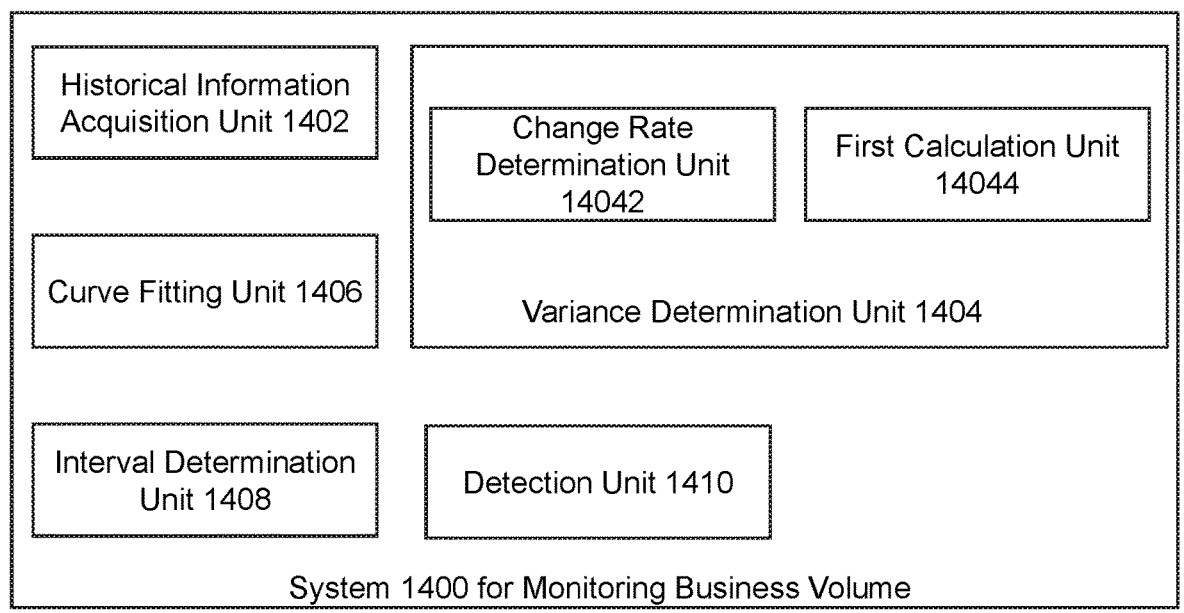
FIG. 14 is a schematic block diagram of a system 1400 for monitoring business volume according to an embodiment of the present disclosure.

FIG. 14 is a schematic block diagram of a system 1400 for monitoring business volume according to an embodiment of the present disclosure. The system 1400 for monitoring business volume may include a historical information acquisition unit 1402, a variance determination unit 1404, a curve fitting unit 1406, an interval determination unit 1408, and a detection unit 1410.

The historical information acquisition unit 1402 may be configured to obtain a plurality of historical business volume measurements based on a predetermined period.

The variance determination unit 1404 may be configured to determine a variance of a change rate. The variance of the change rate may correspond to each of the plurality of historical business volume measurements. The variance determination unit 1404 may include a change rate determination unit 14042 and a first calculation unit 14044.

The change rate determination unit 14042 may be configured to determine a ratio of each historical business volume measurement to a historical business volume measurement relating to a previous period. The ratio may correspond to the change rate.

The first calculation unit 14044 may be configured to determine the variance of the change rate corresponding to each historical business volume measurement based on the plurality of ratios and the average value of the plurality of ratios.

The curve fitting unit 1406 may be configured to determine a fitting curve based on the plurality of variances of the change rates and the corresponding historical business volume measurements.

The interval determination unit 1408 may be configured to determine a range of business volume measurement relating to the current period based on the fitting curve and the plurality of historical business volume measurements.

The detection unit 1410 may be configured to obtain a business volume measurement relating to the current period and determine a relationship between the business volume measurement and the range of the business volume measurement. If the detection unit 1410 determines that the business volume measurement is outside the range of the business volume measurement, the detection unit 1410 may transmit alert to a predetermined target terminal.

First, the ratio of historical business volume measurement at k time point to historical business volume measurement at k−1 time point may be obtained, and the ratio of historical business volume measurement at k−1 time point to historical business volume measurement at k−2 time point may also be obtained, and so on. The ratio of each historical business volume measurement to a historical business volume measurement relating to a previous period may be determined. The time interval between k time point and k−1 time point, between k−1 time point and k−2 time point may be the predetermined period. It should be understood that the historical business volume measurement at k time point may be larger than or less than the historical business volume measurement at k−1 time point. Therefore, the ratio may be centered on 1 and fluctuate up and down. The ratio may be the ratio. There may be a plurality of historical business volume measurements, so there may be a plurality of ratios. The variance of all the ratios may be calculated. The variance of all the rations may correspond to the variance of the ratios relating to the plurality of historical business volume measurements. The method for calculating the variance may include calculating the average value of the square sum of the difference between each ratio and the average value of the ratios. The average value of the square sum may be designated as the variance of the changes rates. The degree of deviation of each historical business volume measurement may be determined. The ratio may correspond to the change rate.

Figure 15:
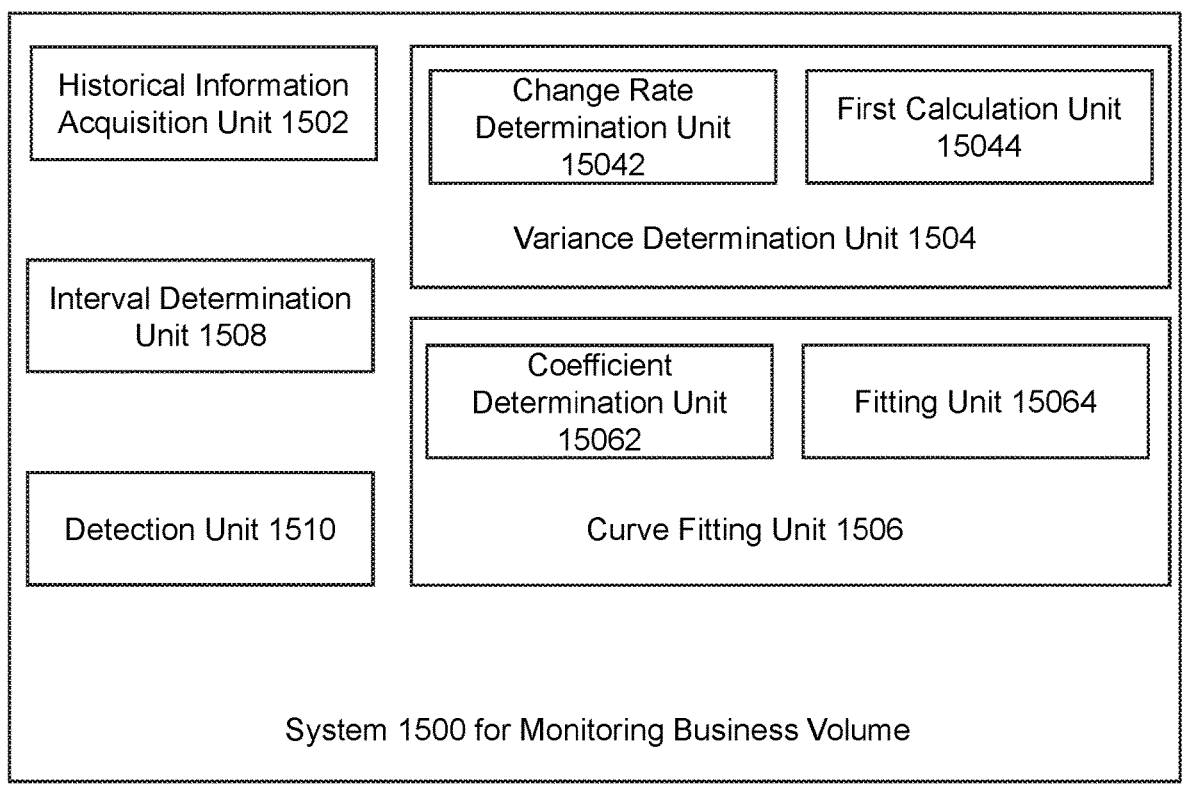
FIG. 15 is a schematic block diagram of a system 1500 for monitoring business volume according to an embodiment of the present disclosure.

FIG. 15 is a schematic block diagram of a system 1500 for monitoring business volume according to an embodiment of the present disclosure. The system 1500 for monitoring business volume may include a historical information acquisition unit 1502, a variance determination unit 1504, a curve fitting unit 1506, an interval determination unit 1508, and a detection unit 1510.

The historical information acquisition unit 1502 may be configured to obtain a plurality of historical business volume measurements based on a predetermined period.

The variance determination unit 1504 may be configured to determine a variance of a change rate. The variance of the change rate may correspond to each of the plurality of historical business volume measurements. The variance determination unit 1404 may include a change rate determination unit 15042 and a first calculation unit 15044.

The change rate determination unit 15042 may be configured to determine a ratio of each historical business volume measurement to a historical business volume measurement relating to a previous period.

The first calculation unit 15044 may be configured to determine the variance of the change rate corresponding to each historical business volume measurement based on the plurality of ratios and the average value of the plurality of ratios.

The curve fitting unit 1506 may be configured to determine a fitting curve based on the plurality of variances of the change rates and the corresponding historical business volume measurements. The curve fitting unit 1506 may include a coefficient determination unit 15062 and a curve fitting unit 15064.

The coefficient determination unit 15062 may be configured to determine an acquisition time point of each historical business volume measurement and determine all historical business volume measurements obtained before the acquisition time point may be determined. The coefficient determination unit 15062 may also determine a variance of change rate relating to all the historical business volume measurements obtained before the acquisition time point.

The curve fitting unit 1506 may be configured to determine a fitting curve based on each historical business volume measurement and the variance of change rate relating to all the historical business volume measurements obtained before the acquisition time point.

The interval determination unit 1508 may be configured to determine a range of business volume measurement relating to the current period based on the fitting curve and the plurality of historical business volume measurements.

The detection unit 1510 may be configured to obtain a business volume measurement relating to the current period and determine a relationship between the business volume measurement and the range of the business volume measurement. If the detection unit 1510 determines that the business volume measurement is outside the range of the business volume measurement, the detection unit 1510 may transmit alert to a predetermined target terminal.

Wherein, the function of the fitting curve may be $y=0.1859e^{-0.005x}$, wherein x represents a historical business volume measurement, y represents the variance of change rate corresponding to the historical business volume measurement.

First, the acquisition time point of each historical business volume measurement may be obtained. For example, every one minute after a current time point may be the acquisition time. A historical business volume measurement may be obtained at the acquisition time. All historical business volume measurements obtained before the acquisition time point may be determined. A variance of the change rate relating to all the historical business volume measurements obtained before the acquisition time point may be determined. The more historical business volume measurements obtained before the acquisition time, the more precisely the obtained variance reflecting the range of the business volume measurement of a current period under normal conditions. Finally, the fitting curve may be determined based on each historical business volume measurement and the variance of change rate relating to all the historical business volume measurements obtained before the acquisition time point. Thereby, the variance of the corresponding business volume measurement may be determined based on the fitting curve and the corresponding business volume measurement relating to the current period. The function of the fitting curve may be $y=0.1859e^{-0.005x}$. According to the function, the greater the historical business volume measurement, the smaller the variance of change rate corresponding to the historical business volume measurement.

Figure 16:
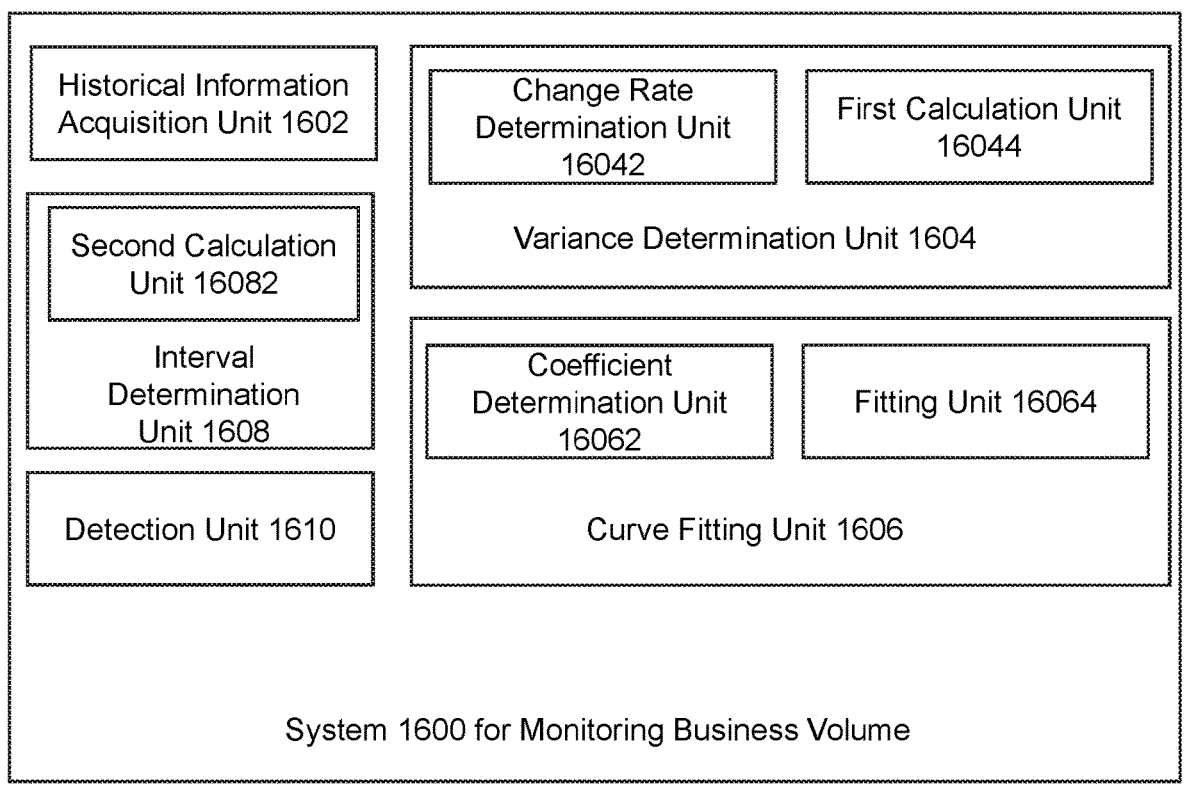
FIG. 16 is a schematic block diagram of a system 1600 for monitoring business volume according to an embodiment of the present disclosure.

FIG. 16 is a schematic block diagram of a system 1600 for monitoring business volume according to an embodiment of the present disclosure. The system 1600 for monitoring business volume may include a historical information acquisition unit 1602, a variance determination unit 1604, a curve fitting unit 1606, an interval determination unit 1608, and a detection unit 1610.

The historical information acquisition unit 1602 may be configured to obtain a plurality of historical business volume measurements based on a predetermined period.

The variance determination unit 1604 may be configured to determine a variance of a change rate. The variance of the change rate may correspond to each of the plurality of historical business volume measurements. The variance determination unit 1404 may include a change rate determination unit 16042 and a first calculation unit 16044.

The change rate determination unit 16042 may be configured to determine a ratio of each historical business volume measurement to a historical business volume measurement relating to a previous period.

The first calculation unit 16044 may be configured to determine the variance of the change rate corresponding to each historical business volume measurement based on the plurality of ratios and the average value of the plurality of ratios.

The curve fitting unit 1606 may be configured to determine a fitting curve based on the plurality of variances of the change rates and the corresponding historical business volume measurements. The curve fitting unit 1606 may include a coefficient determination unit 16062 and a curve fitting unit 16064.

The coefficient determination unit 16062 may be configured to determine an acquisition time point of each historical business volume measurement and determine all historical business volume measurements obtained before the acquisition time point may be determined. The coefficient determination unit 15062 may also determine a variance of change rate relating to all the historical business volume measurements obtained before the acquisition time point.

The curve fitting unit 1506 may be configured to determine a fitting curve based on each historical business volume measurement and the variance of change rate relating to all the historical business volume measurements obtained before the acquisition time point.

The interval determination unit 1608 may be configured to determine a range of business volume measurement relating to the current period based on the fitting curve and the plurality of historical business volume measurements. The interval determination unit 1608 may include a second calculation unit 16082.

The second calculation unit 16082 may be configured to determine a variance of change rate of the historical business volume measurement relating to the previous period based on a historical business volume measurement relating to a previous period of the current period and the fitting curve. The second calculation unit 16082 may determine an interval of the change rate of the historical business volume measurement relating to the previous period based on the variance of change rate relating to the historical business volume measurement relating to the previous period. The second calculation unit 16082 may determine the range of the business volume measurement of the current period based on the interval of the change rate.

The detection unit 1510 may be configured to obtain a business volume measurement relating to the current period and determine a relationship between the business volume measurement and the range of the business volume measurement. If the detection unit 1510 determines that the business volume measurement is outside the range of the business volume measurement, the detection unit 1510 may transmit alert to a predetermined target terminal.

The variance of ratio of the historical business volume measurement relating to the previous period may be determined based on a historical business volume measurement relating to a previous period of the current period and the fitting curve. The method for calculating the variance of ratios may include calculating the average value of the square sum of the difference between each ratio and the average value of the ratios. The average value of the square sum may be designated as the variance of the changes rates. The average value of the ratios may be 1. The variance may be obtained based on the ratios and 1. The variance to may be used to reversely derive the upper limit and lower limit relating to the ratio of orders. The upper limit and lower limit may be $[1-\sqrt{0.1859e^{-0.005x_{k-1}}}, 1+\sqrt{0.1859e^{-0.005x_{k-1}}}]$. Obviously, the range of the business volume measurement of the current period may be obtained based on the upper limit and the lower limit of the variance of ratio relating to the historical business volume measurement relating to the previous period. In the Equation, $x_{k-1}$ is the historical business volume measurement obtained in the previous period. That is, an interval of the business volume measurement relating to the current period under normal conditions may be determined based on the historical business volume measurement relating to the previous period.

Figure 17:
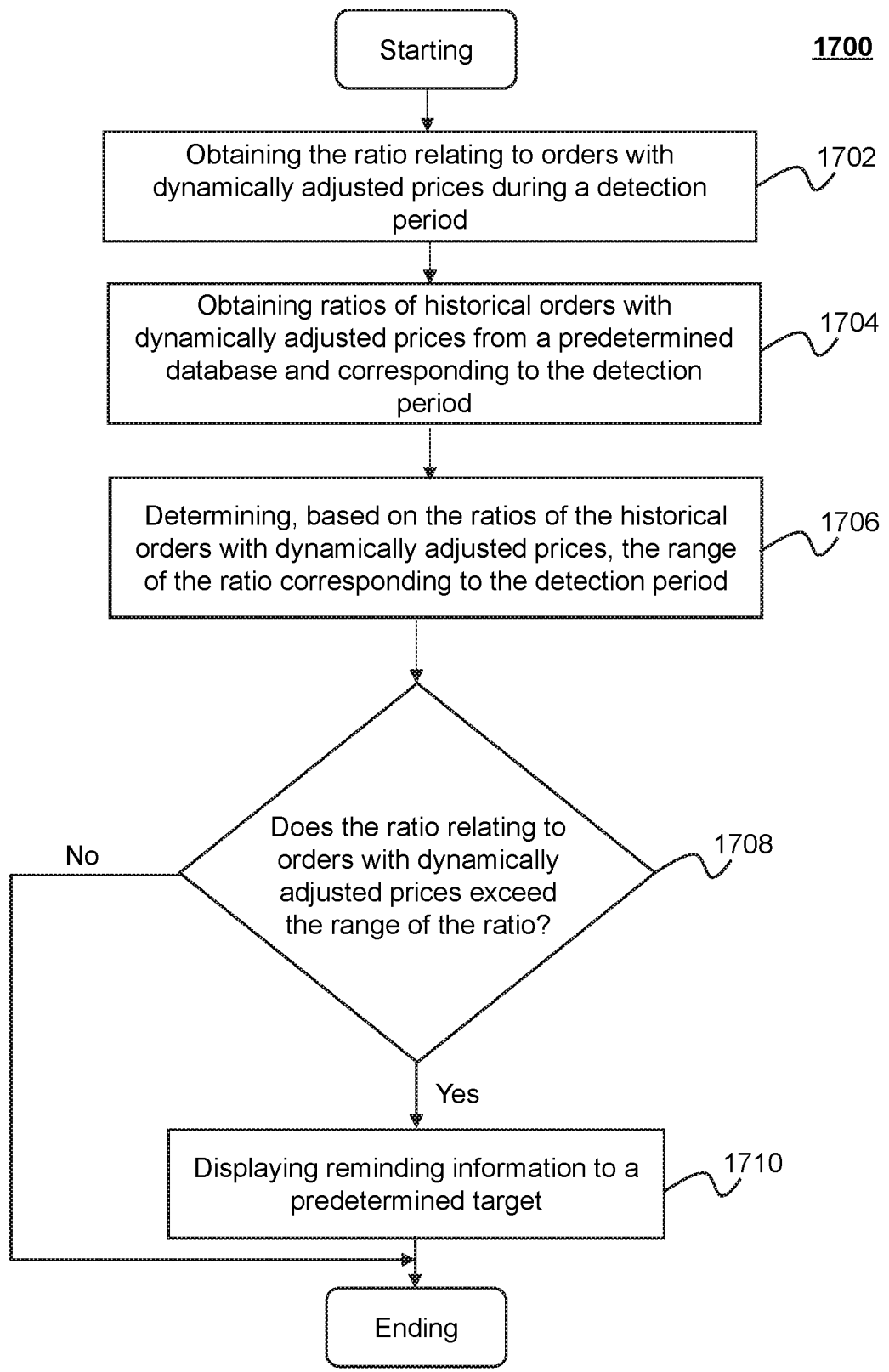
FIG. 17 is a flowchart illustrating an exemplary process for a method for monitoring and reminding according to an embodiment of the present disclosure.

FIG. 17 is a flowchart illustrating an exemplary process for a method for monitoring and reminding according to an embodiment of the present disclosure. The method for monitoring and reminding shown in FIG. 17 may include following operations.

In 1702, a ratio relating to orders with dynamically adjusted prices during a detection period may be obtained.

In 1704, ratios relating to historical orders with dynamically adjusted prices may be obtained from a predetermined database. The historical orders may correspond to the detection period.

In 1706, a range of the ratio corresponding to the detection period may be determined based on the ratios of the historical orders with dynamically adjusted prices.

In 1708, whether the ratio relating to orders with dynamically adjusted prices exceeds the range of the ratio may be determined. A judgment result may be generated.

If the processing engine 112 determines that the ratio relating to the orders with prices dynamically adjusted exceeds the range of the ratio, the process may proceed to 1710, reminding information may be displayed to a predetermined target.

Wherein, in this embodiment, the method for monitoring and reminding may be used for an O2O (Online To Offline) rental order allocation platform, and the detection period may be 30 minutes (Minutes).

In the present embodiment, in 1702, the volume of orders with dynamically adjusted prices corresponding to the detection period may be obtained. The volume of orders with dynamically adjusted prices may be the number of orders with dynamically adjusted prices. The ratio relating to orders with dynamically adjusted prices corresponding to the detection period may be determined based on a total volume of orders. In 1704, ratios relating to historical orders with dynamically adjusted prices may be obtained from a predetermined database. The historical orders may correspond to the detection period. It should be understood that, according to whether the ratio relating to historical orders with dynamically adjusted prices corresponding to the detection period matches the ratio relating to historical orders with dynamically adjusted prices, whether there is an abnormality relating to the ratio relating to orders with dynamically adjusted prices corresponding to the detection period may be determined. In 1706, a range of the ratio corresponding to the detection period may be determined based on the ratios of the historical orders with dynamically adjusted prices. In 1708, whether the ratio relating to orders with dynamically adjusted prices exceeds a range of the ratio may be determined. A judgment result may be determined. If the processing engine 112 determines that the ratio relating to orders with prices dynamically adjusted is within the range of the ratio, the ratio relating to orders with dynamically adjusted prices corresponding to the detection period and the ratio relating to historical orders with dynamically adjusted prices may be consistent. The ratio relating to orders with prices dynamically adjusted corresponding to the detection period may be normal, that is, the total volume of orders with dynamically adjusted prices may be normal. If the processing engine 112 determines that the ratio relating to orders with dynamically adjusted prices exceeds the range of the ratio, the ratio relating to orders with dynamically adjusted prices corresponding to the detection period and the ratio relating to historical orders with dynamically adjusted prices may be inconsistent. The ratio relating to orders with dynamically adjusted prices corresponding to the detection period may be abnormal, that is, the total volume of orders with dynamically adjusted prices may be abnormal. If the ratio relating to orders with dynamically adjusted prices exceeds the range of the ratio, the process may proceed to 1710, reminding information may be displayed to a predetermined target. Thus, the operation and maintenance personnel may promptly find out the abnormal ratio relating to orders with dynamically adjusted prices and make modifications, thus reducing the possibility of user complaints, or the like, due to the abnormal ratio of orders with dynamically adjusted prices. In this way, real-time monitoring and reminding of a ratio of orders with dynamically adjusted prices may be achieved. This may not only satisfy the market's supply-demand balance by orders with dynamically adjusted prices, but also decrease the possibility of the abnormal ratio of orders with dynamically adjusted prices and increase the user satisfaction, thereby enhancing market competitiveness.

Wherein, corresponding to the change of the volume of orders in different time periods, the length of the detection period may be adjusted in real-time according to different time periods to collect enough data for reducing the possibility of misinformation due to accidental factors and improving accuracy of judgments as to whether the ratio of orders with dynamically adjusted prices is abnormal. According to the difference among market demands of different regions, ratios of orders with dynamically adjusted prices corresponding to the detection period may be collected respectively. Whether the ratios of orders with dynamically adjusted prices in different regions are abnormal may be determined based on the ratios of the historical orders with dynamically adjusted prices in different regions.

In some embodiments, the processing engine 112 may, based on the fact that the day relating to the detection period is a working day or a holiday, use the ratios of the historical orders with dynamically adjusted prices corresponding to the working days or corresponding to the holidays to monitor the ratio relating to orders with dynamically adjusted prices.

In the present embodiment, the processing engine 112 may classify the ratios of the historical orders with dynamically adjusted prices based on a working day and a holiday. If the processing engine 112 determines that the day relating to the detection period is a working day, the processing engine 112 may determine whether the ratio relating to orders with dynamically adjusted prices is abnormal by using ratios of the historical orders with dynamically adjusted prices on working days If the processing engine 112 determines that the day relating to the detection period is a holiday, the processing engine 112 may determine whether the ratio relating to orders with dynamically adjusted prices is abnormal by using ratios of the historical orders with dynamically adjusted prices corresponding to the holidays. The above method may satisfy demands of different markets on working days and on holidays, and improve the accuracy of the ratios of the historical orders with dynamically adjusted prices.

In some embodiments, the method for monitoring and reminding may be used for an O2O platform for the distribution of designated driving orders. The detection period may be 1 h (Hour).

In this embodiment, since the volume of designated driving orders per unit time is less than the volume of the rental orders per unit of time, the processing engine 112 may extend the detection period to 1 hour. The possibility of misinformation due to accidental factors may be reduced and the accuracy for determining whether the ratio relating to orders with dynamically adjusted prices is normal may be improved.

In some embodiments, the method for monitoring and reminding may be used for take-out order distribution platform. The detection period may be 20 minutes during a period relating to lunch and dinner, and the detection period may be 1 hour during other time periods.

In this embodiment, since the volume of the take-out order distribution platform is large during the lunch and dinner time periods, the detection period may be shortened to 20 minutes. The processing engine 112 may guarantee the accuracy of detection as to whether the ratio relating to orders with dynamically adjusted prices is normal. The processing engine 112 may recognize abnormalities relating to the ratio of orders with dynamically adjusted prices and make modifications. Since the volume of orders is small during the other time periods, the processing engine 112 may extend the detection period to 1 hour. The possibility of misinformation due to accidental factors may be reduced and the accuracy for determining whether the ratio relating to orders with dynamically adjusted prices is normal may be improved.

Figure 18:
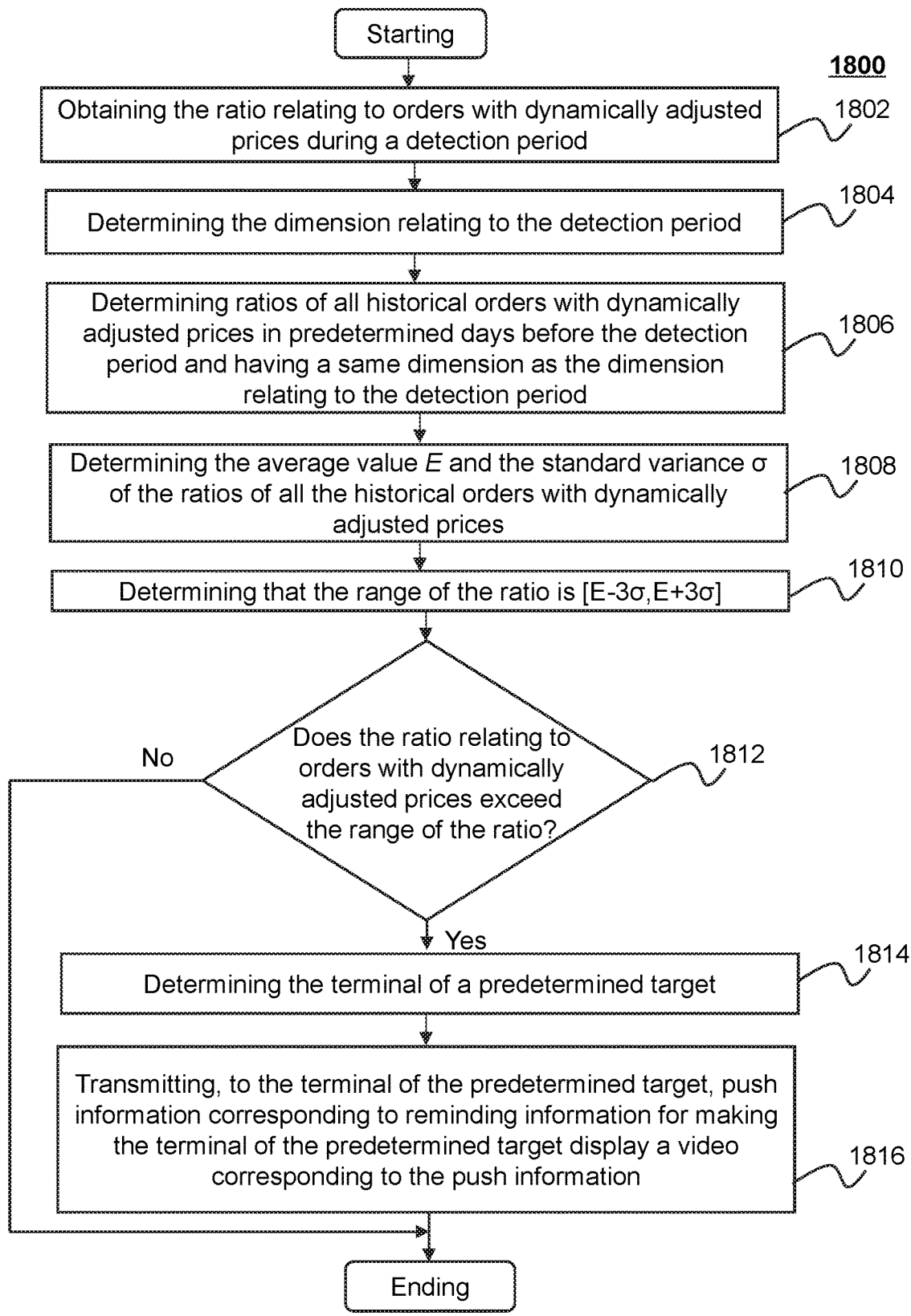
FIG. 18 is a flowchart illustrating an exemplary process for a method for monitoring and reminding according to an embodiment of the present disclosure.

FIG. 18 is a flowchart illustrating an exemplary process for a method for monitoring and reminding according to an embodiment of the present disclosure. As shown in FIG. 18, a method for monitoring and reminding according to an embodiment of the present disclosure may include following operations.

In 1802, a ratio relating to orders with dynamically adjusted prices during a detection period may be obtained.

In 1804, a dimension relating to the detection period may be determined.

In 1806, ratios of all historical orders with dynamically adjusted prices in predetermined days before the detection period may be determined. All the historical orders may have the same dimension as the dimension relating to the detection period.

In 1808, an average value E and a standard variance $\sigma$ may be determined. The average value E and the standard variance σ may relate to the ratios of all the historical orders with prices dynamically adjusted.

In S1810, that the range of the ratio is [E−3σ, E+3σ] may be determined. In some embodiments, the range of the ratio may be from a first value to a second value. The first value is generated by subtracting three times the standard variance from the average value, the second the value is a sum of the average value and the three times the standard variance. In some embodiments, the coefficient relating to the standard variance may be other values instead of three. The other values may range from one to nine.

In 1812, whether the ratio relating to orders with dynamically adjusted prices exceeds a range of the ratio may be determined. A judgment result may be determined.

If the processing engine 112 determines that the ratio relating to orders with prices dynamically adjusted exceeds the range of the ratio, the process may proceed to 1814, a terminal of the predetermined target may be determined.

In 1816, push information corresponding to the reminding information may be transmitted to the terminal of the predetermined target for making the terminal of the predetermined target display a video.

Wherein, the average value E may equal to $$\frac{\sum_{i=1}^{N} hDpOrdRate[i]}{N},$$

the standard variance σ may equal to $$\sqrt{\frac{\sum_{i=1}^{N} (hDpOrdRate[i] - E)^2}{N}},$$

and wherein hDpOrdRate[i] represents a ratio of orders with dynamically adjusted prices corresponding to the dimension in a ith day, N represents a number count of the historical orders. In this embodiment, the system for monitoring and reminding may be used for an O2O rental order distribution platform, the terminal may be a cell phone, and the dimension may include a time period and a place corresponding to the detection period.

In this embodiment, in 1802, orders with dynamically adjusted prices during the detection period may be obtained, that is, the delivery volume of orders with dynamically adjusted prices. A ratio relating to orders with dynamically adjusted prices may be determined based on the total delivery volume of orders. In 1804, a dimension relating to the detection period may be determined, that is, the time period and the place corresponding to the detection period. In 1806, ratios of all historical orders with dynamically adjusted prices in predetermined days before the detection period may be determined. All the historical orders may have a same dimension as the dimension relating to the detection period. It may be understood that the more predetermined days, the more accurate the range of the ratios corresponding to the historical orders with dynamically adjusted prices and the more accurate the judgments as to whether the ratio of orders with dynamically adjusted prices during a detection period is normal. In 1808, according to the statistical principle, an average value E and a standard variance σ may be determined. The average value E may equal to $$\frac{\sum_{i=1}^{N} hDpOrdRate[i]}{N},$$

the standard variance σ may equal to $$\sqrt{\frac{\sum_{i=1}^{N} (hDpOrdRate[i] - E)^2}{N}},$$

and wherein hDpOrdRate[i] represents a ratio of historical orders with dynamically adjusted prices corresponding to the dimension in a ith day, N represents a number count of the historical orders. In 1810, the 3σ principle in the normal distribution model of statistics may be used to determine that the range of the ratio may be [E−3σ, E+3σ] based on the average value E and the standard variance σ both relating to the ratios of all the historical orders with dynamically adjusted prices. In 1812, whether the ratio relating to orders with dynamically adjusted prices exceeds the range of the ratio may be determined. A judgment result may be determined. If the processing engine 112 determines that the ratio relating to orders with prices dynamically adjusted is within the range of the ratio, the ratio relating to orders with dynamically adjusted prices corresponding to the detection period and the ratio relating to historical orders with dynamically adjusted prices may be consistent. The ratio relating to orders with prices dynamically adjusted corresponding to the detection period may be normal, that is, the total volume of orders with dynamically adjusted prices may be normal. If the processing engine 112 determines that the ratio relating to orders with dynamically adjusted prices exceeds the range of the ratio, the ratio relating to orders with dynamically adjusted prices corresponding to the detection period and the ratio relating to historical orders with dynamically adjusted prices may be inconsistent. The ratio relating to orders with dynamically adjusted prices corresponding to the detection period may be abnormal, that is, the total volume of orders with dynamically adjusted prices may be abnormal. If the processing engine 112 determines that the volume relating to orders with dynamically adjusted prices is abnormal, the process may proceed to 1814. In 1814, the terminal of the preset target may be determined. The terminal may be a cellphone of the preset target. In 1816, push information corresponding to the reminding information may be transmitted to the cellphone of the predetermined target. The cell phone may receive the push information and display the video corresponding to the reminding information, which may make it easy for the operation and maintenance personnel to promptly recognize, from the terminal, abnormality of the ratio relating to orders with dynamically adjusted prices during the detection period.

In some embodiments, the dimension may include a time period and a travel distance of an order both corresponding to the detection period. The terminal may be a computer. After receiving the push information, the terminal may play the audio corresponding to the push information.

In this embodiment, the ratio relating to orders with dynamically adjusted prices may be determined based on the time periods of the rental orders and the corresponding range of the travel distances. The processing engine 112 may make that the applicable environment of the ratio of historical orders with dynamically adjusted prices and the applicable environment of the ratio of orders with dynamically adjusted prices are similar. The accuracy of the judgments as to whether the ratio of orders with dynamically adjusted prices is normal may be improved. If the processing engine 112 determines that the ratio relating to orders with dynamically adjusted prices is abnormal, the processing engine 112 may determine a terminal of the predetermined target. The terminal may be a computer of the predetermined target. Push information corresponding to the reminding information may be transmitted to the computer of the predetermined target. The computer may receive the push information and display the video corresponding to the reminding information, which may make it easy for the operation and maintenance personnel to promptly recognize, from the terminal, abnormality of the ratio relating to orders with dynamically adjusted prices during the detection period.

In some embodiments, the processing engine 112 may obtain, via a network, a first ratio during the detection period. The first ratio may relate to orders with dynamically adjusted prices. The first ratio may refer to the ratio of the number of orders with dynamically adjusted prices to the total number of orders during the detection period. The processing engine 112 may determine an expected ratio-range (i.e., the range of the ratio) based on a plurality of second ratios of historical orders with dynamically adjusted prices. The historical orders may be made in historical time periods corresponding to the detection period. The processing engine 112 may determine whether the first ratio is outside the ratio-range. The processing engine 112 may determine alert based on the determination that the first ratio is outside the ratio-range.

For determining the plurality of second ratios, the processing engine 112 may determine a dimension of the detection period. The processing engine 112 may determine a plurality of periods in the predetermined days before the detection period. Each of the plurality of periods may have a same dimension as the dimension of the detection period. For each period in a predetermined day before the detection period, the processing engine 112 may determine a second ratio relating to the historical orders with dynamically adjusted prices.

In some embodiment, the processing engine 112 may determine an average value and a standard variance relating to the plurality of second ratios. The processing engine 112 may determine the expected ratio-range based on the average value and the standard variance. In some embodiments, the expected ratio-range may be from a first value to a second value. The first value is generated by subtracting three times the standard variance from the average value, the second the value is a sum of the average value and the three times the standard variance. In some embodiments, the coefficient relating to the standard variance may be other values instead of three. The other values may range from one to nine.

In some embodiments, as described in connection with descriptions in FIGS. 4-6, the ratio-range corresponding to the detection period may be a specific embodiment of the information for rules for determining alert; the ratio relating to orders with dynamically adjusted prices during the detection period may be a specific embodiment of the operation data. If the processing engine 112 determines that the ratio relating to orders with dynamically adjusted prices is outside the range of the ratio corresponding to the detection period, the processing engine 112 may determine alert.

Figure 19:
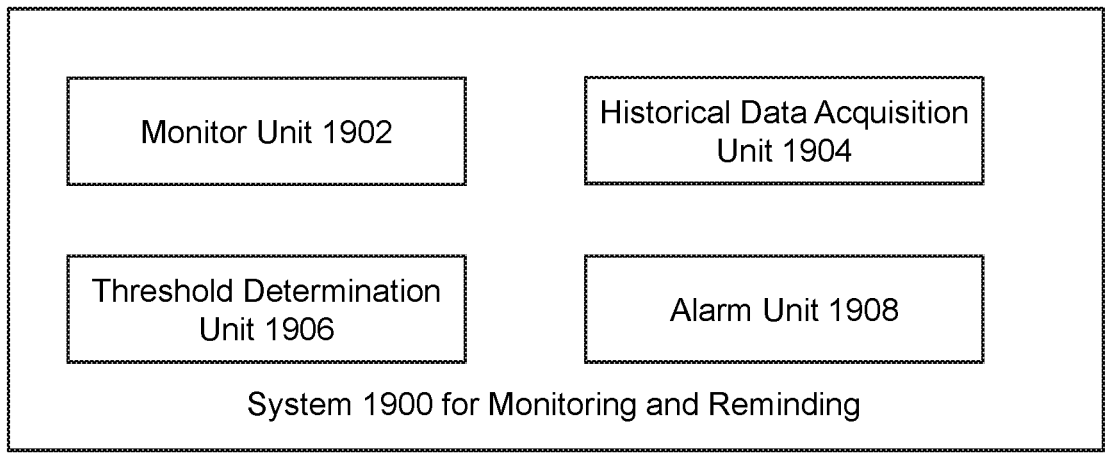
FIG. 19 is a schematic block diagram of a system 1900 for monitoring and reminding according to an embodiment of the present disclosure.

FIG. 19 is a schematic block diagram of a system 1900 for monitoring and reminding according to an embodiment of the present disclosure. The system 1600 for monitoring and reminding may include a monitor unit 1902, a historical data acquisition unit 1904, a threshold determination unit 1906, and an alarm unit 1908.

The monitor unit 1902 may be configured to obtain a ratio relating to orders with dynamically adjusted prices during a detection period.

The historical data acquisition unit 1904 may be configured to obtain ratios relating to historical orders with dynamically adjusted prices from a predetermined database. The historical orders may correspond to the detection period.

The threshold determination unit 1906 may be configured to determine a range of the ratio corresponding to the detection period based on the ratios of the historical orders with dynamically adjusted prices.

The alarm unit 1908 may be configured to display reminding information a predetermined target based on a determination result that the ratio relating to orders with dynamically adjusted prices exceeds the range of the ratio.

Wherein, in this embodiment, the method for monitoring and reminding may be used for an O2O (Online To Offline) rental order allocation platform, and the detection period may be 30 minutes (Minutes).

In the present embodiment, firstly the monitor unit 1902 may obtain the volume of orders with dynamically adjusted prices corresponding to the detection period and determine the ratio relating to orders with dynamically adjusted prices corresponding to the detection period based on a total volume of order. The ratio relating to orders with dynamically adjusted prices corresponding to the detection period may be determined based on a total volume of orders. Then the historical data acquisition unit 1904 may obtain ratios relating to historical orders with dynamically adjusted prices from a predetermined database. The historical orders may correspond to the detection period. It should be understood that, according to whether the ratio relating to historical orders with dynamically adjusted prices corresponding to the detection period matches the ratio relating to historical orders with dynamically adjusted prices, whether there is an abnormality relating to the ratio relating to orders with dynamically adjusted prices corresponding to the detection period may be determined. The threshold determination unit 1906 may determine a range of the ratio corresponding to the detection period based on the ratios of the historical orders with dynamically adjusted prices. The threshold determination unit 1906 may determine whether the ratio relating to orders with dynamically adjusted prices exceeds a range of the ratio. A judgment result may be determined. If threshold determination unit 1906 determines that the ratio relating to orders with prices dynamically adjusted is within the range of the ratio, the threshold determination unit 1906 may determine that the ratio relating to orders with dynamically adjusted prices corresponding to the detection period and the ratio relating to historical orders with dynamically adjusted prices are consistent. The ratio relating to orders with prices dynamically adjusted corresponding to the detection period may be normal, that is, the total volume of orders with dynamically adjusted prices may be normal. If the threshold determination unit 1906 determines that the ratio relating to orders with dynamically adjusted prices exceeds the range of the ratio, the threshold determination unit 1906 may determine the ratio relating to orders with dynamically adjusted prices corresponding to the detection period and the ratio relating to historical orders with dynamically adjusted prices are inconsistent. The ratio relating to orders with dynamically adjusted prices corresponding to the detection period may be abnormal, that is, the total volume of orders with dynamically adjusted prices may be abnormal. If the ratio relating to orders with dynamically adjusted prices exceeds the range of the ratio, the alarm unit 1908 may display reminding information to a predetermined target. Thus, the operation and maintenance personnel may promptly find out the abnormal ratio relating to orders with dynamically adjusted prices and make modifications, thus reducing the possibility of user complaints, or the like, due to the abnormal ratio of orders with dynamically adjusted prices. In this way, real-time monitoring and reminding of a ratio of orders with dynamically adjusted prices may be achieved. This may not only satisfy the market's supply-demand balance by orders with dynamically adjusted prices, but also decrease the possibility of the abnormal ratio of orders with dynamically adjusted prices and increase the user satisfaction, thereby enhancing market competitiveness.

Wherein, corresponding to the change of the volume of orders in different time periods, the length of the detection period may be adjusted in real-time according to different time periods to collect enough data for reducing the possibility of misinformation due to accidental factors and improving accuracy of judgments as to whether the ratio of orders with dynamically adjusted prices is abnormal. According to the difference among market demands of different regions, ratios of orders with dynamically adjusted prices corresponding to the detection period may be collected respectively. Whether the ratios of orders with dynamically adjusted prices in different regions are abnormal may be determined based on the ratios of the historical orders with dynamically adjusted prices in different regions.

In some embodiments, the processing engine 112 may, based on the fact that the day relating to the detection period is a working day or a holiday, use the ratios of the historical orders with dynamically adjusted prices corresponding to the working days or corresponding to the holidays to monitor the ratio relating to orders with dynamically adjusted prices.

In the present embodiment, the processing engine 112 may classify the ratios of the historical orders with dynamically adjusted prices based on a working day and a holiday. If the processing engine 112 determines that the day relating to the detection period is a working day, the processing engine 112 may determine whether the ratio relating to orders with dynamically adjusted prices is abnormal by using ratios of the historical orders with dynamically adjusted prices on working days If the processing engine 112 determines that the day relating to the detection period is a holiday, the processing engine 112 may determine whether the ratio relating to orders with dynamically adjusted prices is abnormal by using ratios of the historical orders with dynamically adjusted prices corresponding to the holidays. The above method may satisfy demands of different markets on working days and on holidays, and improve the accuracy of the ratios of the historical orders with dynamically adjusted prices.

In some embodiments, the method for monitoring and reminding may be used for an O2O platform for the distribution of designated driving orders. The detection period may be 1 h (Hour).

In this embodiment, since the volume of designated driving orders per unit time is less than the volume of the rental orders per unit of time, the processing engine 112 may extend the detection period to 1 hour. The possibility of misinformation due to accidental factors may be reduced and the accuracy for determining whether the ratio relating to orders with dynamically adjusted prices is normal may be improved.

In some embodiments, the method for monitoring and reminding may be used for take-out order distribution platform. The detection period may be 20 minutes during a time period relating to lunch and dinner, and the detection period may be 1 hour during other time periods.

In this embodiment, since the volume of the take-out order distribution platform is large during the time period relating to lunch and dinner, the detection period may be shortened to 20 minutes. The processing engine 112 may guarantee the accuracy of detection as to whether the ratio relating to orders with dynamically adjusted prices is normal. The processing engine 112 may recognize abnormalities relating to the ratio of orders with dynamically adjusted prices and make modifications. Since the volume of orders is small during the other time periods, the processing engine 112 may extend the detection period to 1 hour. The possibility of misinformation due to accidental factors may be reduced and the accuracy for determining whether the ratio relating to orders with dynamically adjusted prices is normal may be improved.

Figure 20:
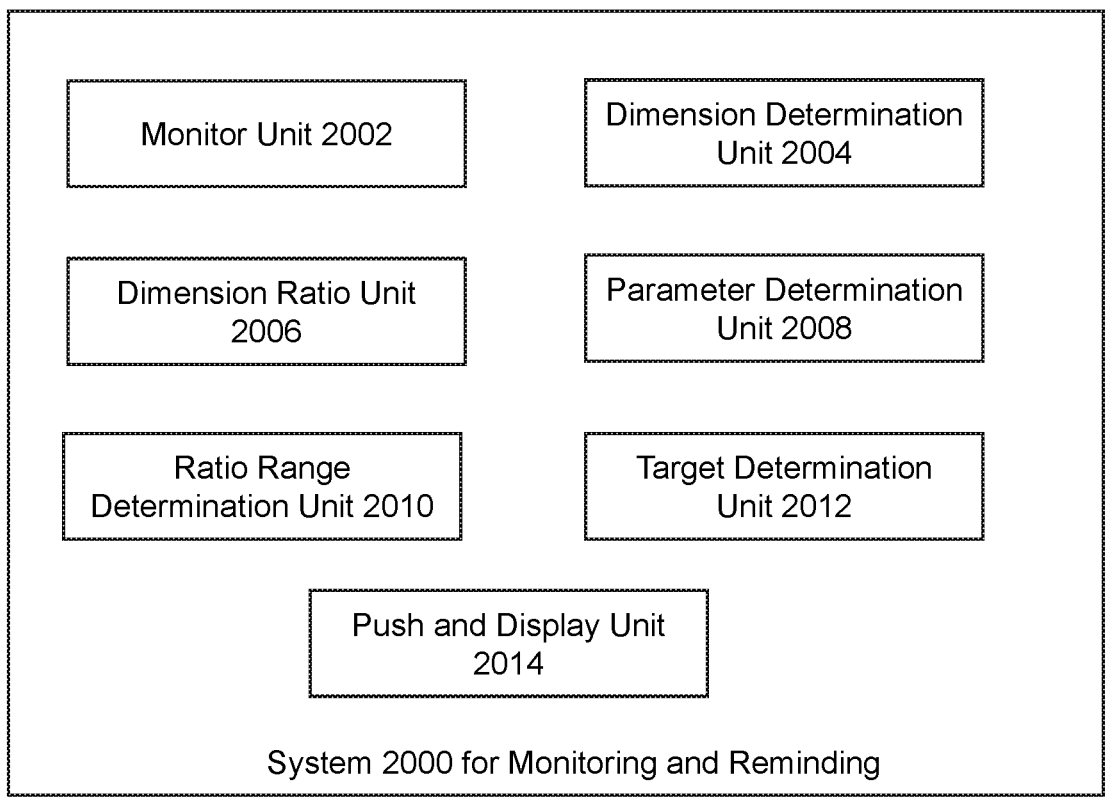
FIG. 20 is a schematic block diagram of a system 2000 for monitoring and reminding according to an embodiment of the present disclosure.

FIG. 20 is a schematic block diagram of a system 2000 for monitoring and reminding according to an embodiment of the present disclosure. The system 2000 for monitoring and reminding may include a monitor unit 2002, a dimension determination unit 2004, a dimension ration unit 2006, a parameter determination unit 2008, a ratio range determination unit 2010, a target determination unit 2012, and a push and display unit 2014.

The monitor unit 2002 may be configured to obtain a ratio relating to orders with dynamically adjusted prices during a detection period.

The dimension determination unit 2004 may be configured to determine a dimension relating to the detection period.

The dimension ration unit 2006 may be configured to determine ratios of all historical orders with dynamically adjusted prices in predetermined days before the detection period. All the historical orders may have the same dimension as the dimension relating to the detection period.

The parameter determination unit 2008 may be configured to determine an average value E and a standard variance σ. The average value E and the standard variance σ may relate to the ratios of all the historical orders with prices dynamically adjusted.

The ratio range determination unit 2010 may be configured to determine that the range of the ratio is [E−3σ, E+3σ].

The target determination unit 2012 may be configured to determine a terminal of the predetermined target.

The a push and display unit 2014 may be configured to transmit push information corresponding to the reminding information to the terminal of the predetermined target for making the terminal of the predetermined target display a video.

Wherein, the average value E may equal to $$\frac{\sum_{i=1}^{N} hDpOrdRate[i]}{N},$$

the standard variance σ may equal to $$\sqrt{\frac{\sum_{i=1}^{N}(hDpOrdRate[i]-E)^2}{N}},$$

and wherein hDpOrdRate[i] represents a ratio of orders with dynamically adjusted prices corresponding to the dimension in a ith day, N represents a number count of the historical orders. In this embodiment, the system for monitoring and reminding may be used for an O2O rental order distribution platform, the terminal may be a cell phone, and the dimension may include a time period and a place corresponding to the detection period.

In this embodiment, the monitor unit 2002 may obtain the ratio relating to orders with dynamically adjusted prices during the detection period. The dimension determination unit 2004 may determine the dimension relating to the detection period, that is, the time period and the place corresponding to the detection period. The dimension ration unit may obtain ratios of all historical orders with dynamically adjusted prices in predetermined days before the detection period may be determined. All the historical orders may have a same dimension as the dimension relating to the detection period. It may be understood that the more predetermined days, the more accurate the range of the ratios corresponding to the historical orders with dynamically adjusted prices and the more accurate the judgments as to whether the ratio of orders with dynamically adjusted prices during a detection period is normal. The parameter determination unit 2008 may determine, based on the statistical principle, an average value E and a standard variance σ. The average value E may equal to $$\frac{\sum_{i=1}^{N}hDpOrdRate[i]}{N},$$

the standard variance σ may equal to $$\sqrt{\frac{\sum_{i=1}^{N}(hDpOrdRate[i]-E)^2}{N}},$$

and wherein hDpOrdRate[i] represents a ratio of historical orders with dynamically adjusted prices corresponding to the dimension in a ith day, N represents a number count of the historical orders. The ratio range determination unit 2010 may use the 3σ principle in the normal distribution model of statistics to determine that the range of the ratio is [E−3σ, E+3σ] based on the average value E and the standard variance σ both relating to the ratios of all the historical orders with dynamically adjusted prices. If The ratio range determination unit 2010 determines that the ratio relating to orders with prices dynamically adjusted is within the range of the ratio, the ratio range determination unit 2010 may determine that the ratio relating to orders with dynamically adjusted prices corresponding to the detection period and the ratio relating to historical orders with dynamically adjusted prices are consistent. The ratio relating to orders with prices dynamically adjusted corresponding to the detection period may be normal, that is, the total volume of orders with dynamically adjusted prices may be normal. If the ratio range determination unit 2010 determines that the ratio relating to orders with dynamically adjusted prices exceeds the range of the ratio, the ratio range determination unit 2010 may determine that the ratio relating to orders with dynamically adjusted prices corresponding to the detection period and the ratio relating to historical orders with dynamically adjusted prices may be inconsistent. At this time, the target determination unit 2012 may determine the terminal of the preset target may be determined. The terminal may be a cellphone of the preset target. The push and display unit 2014 may transmit the push information corresponding to the reminding information to the cellphone of the predetermined target. The cell phone may receive the push information and display the video corresponding to the reminding information, which may make it easy for the operation and maintenance personnel to promptly recognize, from the terminal, abnormality of the ratio relating to orders with dynamically adjusted prices during the detection period.

In some embodiments, the dimension may include a time period and a travel distance of an order both corresponding to the detection period. The terminal may be a computer. After receiving the push information, the terminal may play the audio corresponding to the push information.

In this embodiment, the ratio relating to orders with dynamically adjusted prices may be determined based on the time periods of the rental orders and the corresponding range of the travel distances. The processing engine 112 may make that the applicable environment of the ratio of historical orders with dynamically adjusted prices and the applicable environment of the ratio of orders with dynamically adjusted prices are similar. The accuracy of the judgments as to whether the ratio of orders with dynamically adjusted prices is normal may be improved. If the processing engine 112 determines that the ratio relating to orders with dynamically adjusted prices is abnormal, the processing engine 112 may determine a terminal of the predetermined target. The terminal may be a computer of the predetermined target. Push information corresponding to the reminding information may be transmitted to the computer of the predetermined target. The computer may receive the push information and display the video corresponding to the reminding information, which may make it easy for the operation and maintenance personnel to promptly recognize, from the terminal, abnormality of the ratio relating to orders with dynamically adjusted prices during the detection period.

In the foregoing descriptions, the processing engine 112 may determine alert based on a determination that the operation data is in accordance with the rules for determining alert. The information for rules for determining alert may include a range of a business volume measurement, an expected variance, a ratio-range (i.e., a range of a ratio), or the like, or a combination thereof. In some embodiments, the operation data may include the business volume measurement relating to a current period, the ratio relating to orders with dynamically adjusted prices during a detection period, the number count of orders with dynamically adjusted prices during the detection period, the total number count of orders during the detection period.

In some embodiments, the rule for determine alert associated with the range of the business volume measurement may refer to that: if processing engine 112 determines that the business volume measurement is outside the range of the business volume measurement, the processing engine 112 may determine alert. In some embodiments, the rule for determine alert associated with the expected variance may refer to that: if processing engine 112 determines that a difference between the expected variance and an actual variance is larger than a threshold, the processing engine 112 may determine alert. In some embodiments, the rule for determine alert associated with the ratio-range may refer to that: if the processing engine 112 determines that the ratio relating to orders with dynamically adjusted prices is outside the ratio-range, the processing engine 112 may determine alert.

In some embodiments, the processing engine 112 may determine alert based on the determination that the business volume measurement relating to a current period is outside the range of the business volume measurement. The processing engine 112 may determine alert based on the determination that the ratio relating to orders with dynamically adjusted prices during the detection period is outside the ratio-range. The processing engine 112 may also determine alert based on the determination that a difference between the actual variance and the expected variance is larger than a threshold.

The processing engine 112 may transmit the alert to be displayed to managers of the on-demand (i.e. O2O) service. Here, the managers of the on-demand service refer to personnel that maintain the performance of the platform for the service. The managers of the on-demand service may debug and maintain the on-demand service system based on the alert. In some embodiments, the processing engine 112 may transmit the alert to a target terminal of the managers, or to target terminals individually associated with the managers. The target terminal may display the alert to the managers of the on-demand service. The target terminal may be a mobile terminal (e.g., a mobile phone, an ipad, etc.) having a screen for displaying the alert or a loudspeaker for playing an audio relating to the alert. The alert may be displayed in a format including figure or chart. In some embodiments, the alert may include options regarding: (1) whether to take actions to avert the cause of the alert; and/or (2) what actions should be taken.

After receiving the alert, the managers of the on-demand service may analyze the alert and/or respond to the options presented by the alert. For example, the managers of the on-demand service may determine whether the on-demand service system is under attack or whether users can access the on-demand service system successfully. The managers of the on-demand service may determine that the on-demand service system needs repairing based on the determination that the on-demand service system is under attack or users cannot access the on-demand service system successfully.

In some embodiments, the alert may include suggestion information (e.g., the first information, the reminding information). The suggestion information may inquire whether the managers choose to eliminate the alert by changing operation of the on-demand service. The managers may choose to eliminate the alert and change operation of the on-demand service after analyzing the alert. The managers may then determine a corresponding reply accordingly and send the reply to the processing engine 112 using the target terminal. The processing engine 112 may, in response to receiving the reply from the managers of the on-demand service to change the operation of the on-demand service, extract part of the operation data that causes the alert, and change the operation of the on-demand service based on the part of the operation data.

If the processing engine 112 determines the information for rules for determining alert, the processing engine 112 may collect historical data. The historical data may include historical business volume measurements, historical orders with dynamically adjusted prices in predetermined days, historical orders in the predetermined days, or the like, or a combination thereof. For improving the accuracy, the processing engine 112 may refine the historical data. For example, the processing engine 112 may use corresponding historical data and omit irrelevant historical data for determining the information for rules for determining alert.

In some embodiments, the processing engine 112 may use the historical business volume measurements to determine the range of the business volume measurement of a current period. The business volume measurement of the current period may relate to a dimension of the current period and a position. The processing engine 112 may use the historical business volume measurements associated with both the dimension of the current period and the position. The processing engine 112 may also omit abnormal historical business volume measurements in a special day. For example, the day relates to a catastrophe, a celebration day with limited driving, a marathon day with closed roads, or the like. The processing engine 112 may also collect many relevant historical business volume measurements as far as possible. More samples, more accurate. The processing engine 112 may use the refined historical business volume measurements to determine the range of the business volume measurement of a current period. Similarly, the processing engine 112 may use the same or similar data refinement method for collecting relevant historical orders with dynamically adjusted prices in predetermined days. The processing engine 112 may determine ratios relating to the refined historical orders with dynamically adjusted prices and then determine the ratio-range.

After determining the alert, the processing engine 112 may further confirm the alert. In some embodiments, the processing engine 112 may obtain the operation data again and determine whether the operation data is in accordance with the rules for determining alert again. In another embodiment, the alert may indicate that the on-demand service system is abnormal. The processing engine 112 may obtain relevant operation data theoretically due to the abnormal on-demand service system. The processing engine 112 may confirm the alert based on the relevant operation data.

The technical solution of the present disclosure is described in detail above with reference to the accompanying drawings. By adopting the technical solution of the present disclosure, the processing engine 112 may compare a ratio relating to orders with dynamically adjusted prices during a detection period with a ratio-range determined based on ratios of historical orders corresponding to the detection period. The processing engine 112 may determine whether the ratio relating to orders with dynamically adjusted prices during the detection period are abnormal. If the processing engine 112 determines an abnormality, the processing engine 112 may achieve real-time monitoring and reminding of a ratio of orders with dynamically adjusted prices. This may not only satisfy the market's supply-demand balance by orders with dynamically adjusted prices, but also decrease the possibility of the abnormal ratio of orders with dynamically adjusted prices and increase the user satisfaction, thereby enhancing market competitiveness.

The operations in the method of the present disclosure may be sequentially adjusted, combined, and omitted according to actual needs.

The units in the devices of the present disclosure may be combined, divided, and omitted according to actual needs.

In the description of the present disclosure, the description of the terms "one embodiment", "some embodiments", "a specific embodiment", or the like, may refer to that the specific features, structures, materials, or characteristics described in connection with the embodiments or the examples are included in at least one of embodiments of the present disclosure.

In an embodiment or an example or in the present disclosure, the schematic representation of the above terms does not necessarily refer to the same embodiment or example. Furthermore, the particular features, structures, materials, or characteristics described may be combined in a suitable manner in any one or more embodiments or examples.

The above is only a preferred embodiment of the present disclosure, and is not intended to limit the scope of the present disclosure, and various modifications and changes may be made to the present disclosure. Any modifications, equivalent substitutions, improvements, or the like, made within the spirit and scope of the present disclosure are intended to be included within the scope of the present invention.

It should be noted that the above descriptions about the processes (e.g., the process 400, the process 500, the process 600, the process 900, the process 1000, the process 1100, the process 1200, the process 1700, and the process 1800) are provided for illustration purposes, and should not be designated as the only practical embodiment. For persons having ordinary skills in the art, after understanding the general principle of the processes, without departing the principle, may modify or change the forms or details of the particular practical ways and steps, and further make simple deductions or substitutions, or may make modifications or combinations of some steps without further creative efforts. However, those variations and modifications do not depart the scope of the present disclosure. Additionally or alternatively, one or more steps may be omitted. In some embodiments, two or more steps may be integrated into a step, or a step may be separated into two steps.

It should be noted that the above descriptions of the devices, systems, and/or terminals (e.g., the detection system 700, the detection system 800, the system 1300, the system 1400, the system 1500, the system 1600, the system 1900, and the processing engine 112) is merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer-readable medium having computer readable program code embodied thereon.

A computer readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python or the like, conventional procedural programming languages, such as the "C" programming language, Visual Basic, Fortran, Perl, COBOL, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A method implemented on a computing device having one or more processors and a storage device, the method comprising:
   obtaining a business volume measurement relating to a current period;
   determining whether the business volume measurement is outside an expected range of the business volume measurement of the current period; and
   transmitting an alert to a predetermined target terminal based on the determination that the business volume measurement is outside the expected range of the business volume measurement of the current period, wherein the alert is to be displayed as figures or charts on the screens of the predetermined target terminal or played by a speaker of the predetermined target terminal to managers of the on-demand service, and the predetermined target terminal is associated with the managers, and
   the expected range of the business volume measurement of the current period is provided by:
      obtaining a plurality of historical business volume measurements made in historical periods corresponding to the current period;
      for each historical business volume measurement,
         determining a reference period relating to the each historical business volume measurement,
         obtaining a plurality of target historical business volume measurements relating to periods before the reference period;
         determining a plurality of groups by designating two adjacent target historical business volume measurements in time as a group,
         for each group, determining a change rate of a posterior target historical business volume measurement to a previous target historical business volume measurement,
         determining an average value of a plurality of change rates corresponding to the plurality of groups, and
         determining, based on the plurality of change rates and the average value, the variance of change rate corresponding to the each historical business volume measurement;
      determining a plurality of variances of change rates corresponding to the plurality of historical business volume measurements;
      determining a fitting curve based on the plurality of variances of change rates and the corresponding plurality of historical business volume measurements; and
      determining the expected range of the business volume measurement of the current period based on the fitting curve and the corresponding plurality of historical business volume measurements.

2. The method of claim 1, wherein determining the expected range of the business volume measurement of the current period based on the plurality of variances of change rates and the corresponding plurality of historical business volume measurements comprises:
   determining, based on a previous historical business volume measurement relating to a previous period of the current period and the fitting curve, a previous variance of change rate of the previous historical business volume measurement;
   determining, based on the previous variance of change rate, a previous interval of the change rate of the previous historical business volume measurement; and
   determining, based on the previous interval of the change rate, the expected range of the business volume measurement of the current period.

3. The method of claim 1, wherein the alert includes suggestion information, the suggestion information indicating that the business volume measurement relating to the current period is abnormal and inquiring whether the managers choose to eliminate the alert by changing operation of the on-demand service.

4. The method of claim 3, further comprising:
   in response to receiving a reply from the managers of the on-demand service to change the operation of the on-demand service, extracting part of the operation data that causes the alert, and changing the operation of the on-demand service based on the part of the operation data, wherein the part of the operation data includes the abnormal business volume measurement relating to the current period.

5. A system for determining alert for an on-demand service comprising:
   a storage device storing a set of instructions; and
   one or more processors in communication with the storage device, wherein when executing the set of instructions, the one or more processors are configured to cause the system to:
      obtain a business volume measurement relating to a current period;
      determine whether the business volume measurement is outside an expected range of the business volume measurement of the current period; and
      transmit an alert to a predetermined target terminal based on the determination that the business volume measurement is outside the expected range of the business volume measurement of the current period, wherein the alert is to be displayed as figures or charts on the screens of the predetermined target terminal or played by a speaker of the predetermined target terminal to managers of the on-demand service, and the predetermined target terminal is associated with the managers, and
      the expected range of the business volume measurement of the current period is provided by:
         obtaining a plurality of historical business volume measurements made in historical periods corresponding to the current period;
         for each historical business volume measurement,
            determining a reference period relating to the each historical business volume measurement, obtaining a plurality of target historical business volume measurements relating to periods before the reference period;

determining a plurality of groups by designating two adjacent target historical business volume measurements in time as a group, for each group, determining a change rate of a posterior target historical business volume measurement to a previous target historical business volume measurement, determining an average value of a plurality of change rates corresponding to the plurality of groups, and determining, based on the plurality of change rates and the average value, the variance of change rate corresponding to the each historical business volume measurement;

determining a plurality of variances of change rates corresponding to the plurality of historical business volume measurements;

determining a fitting curve based on the plurality of variances of change rates and the corresponding plurality of historical business volume measurements; and determining the expected range of the business volume measurement of the current period based on the fitting curve and the corresponding plurality of historical business volume measurements.

6. The system of claim 5, wherein to determine the expected range of the business volume measurement of the current period based on the plurality of variances of change rates and the corresponding plurality of historical business volume measurements, the one or more processors are further configured to cause the system to:

determine, based on a previous historical business volume measurement relating to a previous period of the current period and the fitting curve, a previous variance of change rate of the previous historical business volume measurement;

determine, based on the previous variance of change rate, a previous interval of the change rate of the previous historical business volume measurement; and determine, based on the previous interval of the change rate, the expected range of the business volume measurement of the current period.

7. The system of claim 5, wherein the alert includes suggestion information, the suggestion information indicating that the business volume measurement relating to the current period is abnormal and inquiring whether the managers choose to eliminate the alert by changing operation of the on-demand service.

8. The system of claim 7, wherein the one or more processors are configured to further cause the system to:

in response to receiving a reply from the managers of the on-demand service to change the operation of the on-demand service, extract part of the operation data that causes the alert, and change the operation of the on-demand service based on the part of the operation data, wherein the part of the operation data includes the abnormal business volume measurement relating to the current period.

9. A non-transitory computer readable medium, comprising at least one set of instructions for determining alert for an on-demand service, wherein when executed by at least one processor, the at least one set of instructions direct the at least one processor to:

obtain a business volume measurement relating to a current period;

determine whether the business volume measurement is outside an expected range of the business volume measurement of the current period; and transmit an alert to a predetermined target terminal based on the determination that the business volume measurement is outside the expected range of the business volume measurement of the current period, wherein the alert is to be displayed as figures or charts on the screens of the predetermined target terminal or played by a speaker of the predetermined target terminal to managers of the on-demand service, and the predetermined target terminal is associated with the managers, and the expected range of the business volume measurement of the current period is provided by:

obtaining a plurality of historical business volume measurements made in historical periods corresponding to the current period;

for each historical business volume measurement, determining a reference period relating to the each historical business volume measurement, obtaining a plurality of target historical business volume measurements relating to periods before the reference period;

determining a plurality of groups by designating two adjacent target historical business volume measurements in time as a group, for each group, determining a change rate of a posterior target historical business volume measurement to a previous target historical business volume measurement, determining an average value of a plurality of change rates corresponding to the plurality of groups, and determining, based on the plurality of change rates and the average value, the variance of change rate corresponding to the each historical business volume measurement;

determining a plurality of variances of change rates corresponding to the plurality of historical business volume measurements;

determining a fitting curve based on the plurality of variances of change rates and the corresponding plurality of historical business volume measurements; and determining the expected range of the business volume measurement of the current period based on the fitting curve and the corresponding plurality of historical business volume measurements.

* * * * *